INVENTORS
Robert N. Cundall
Lincoln A. Cundall
BY
ATTORNEY

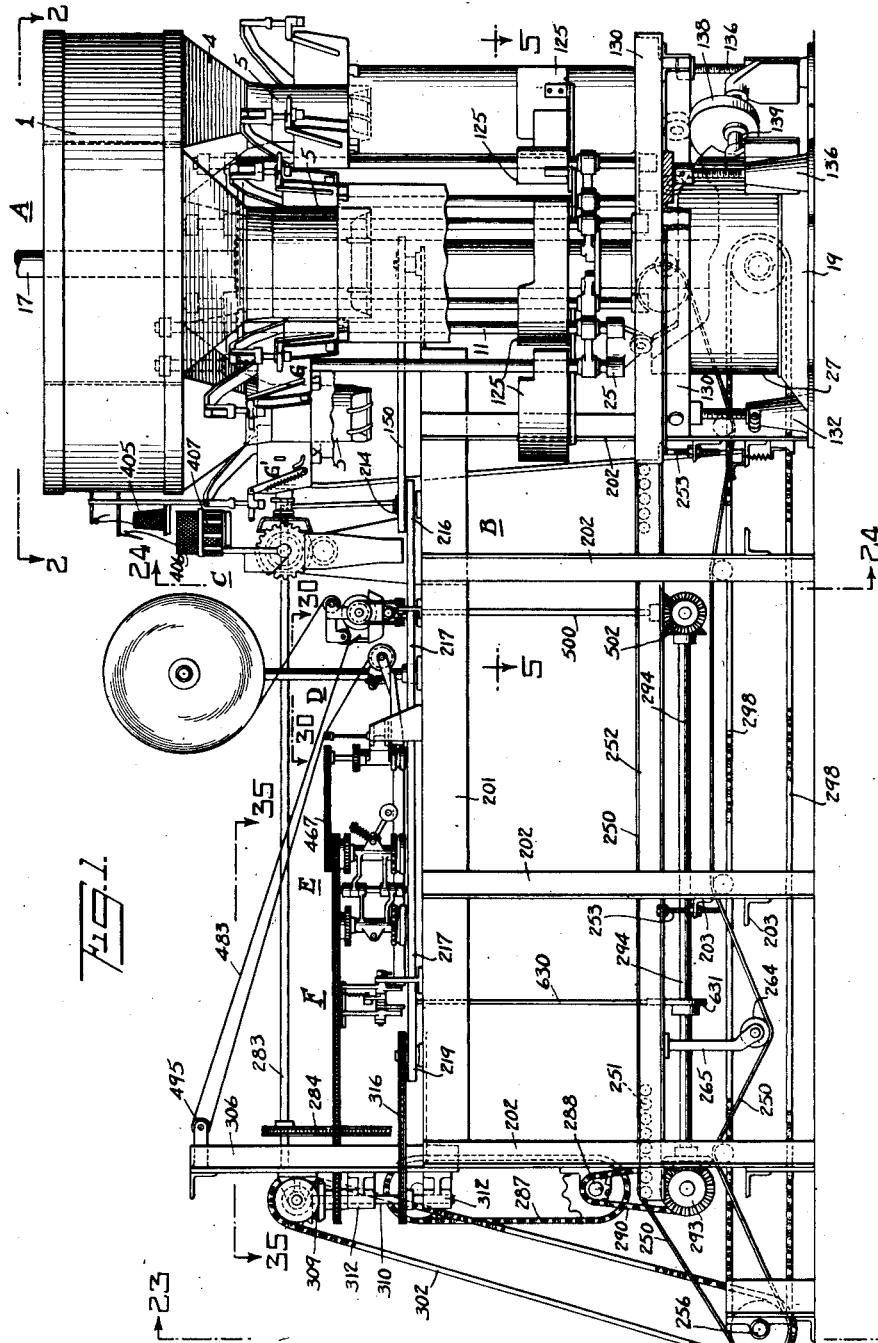

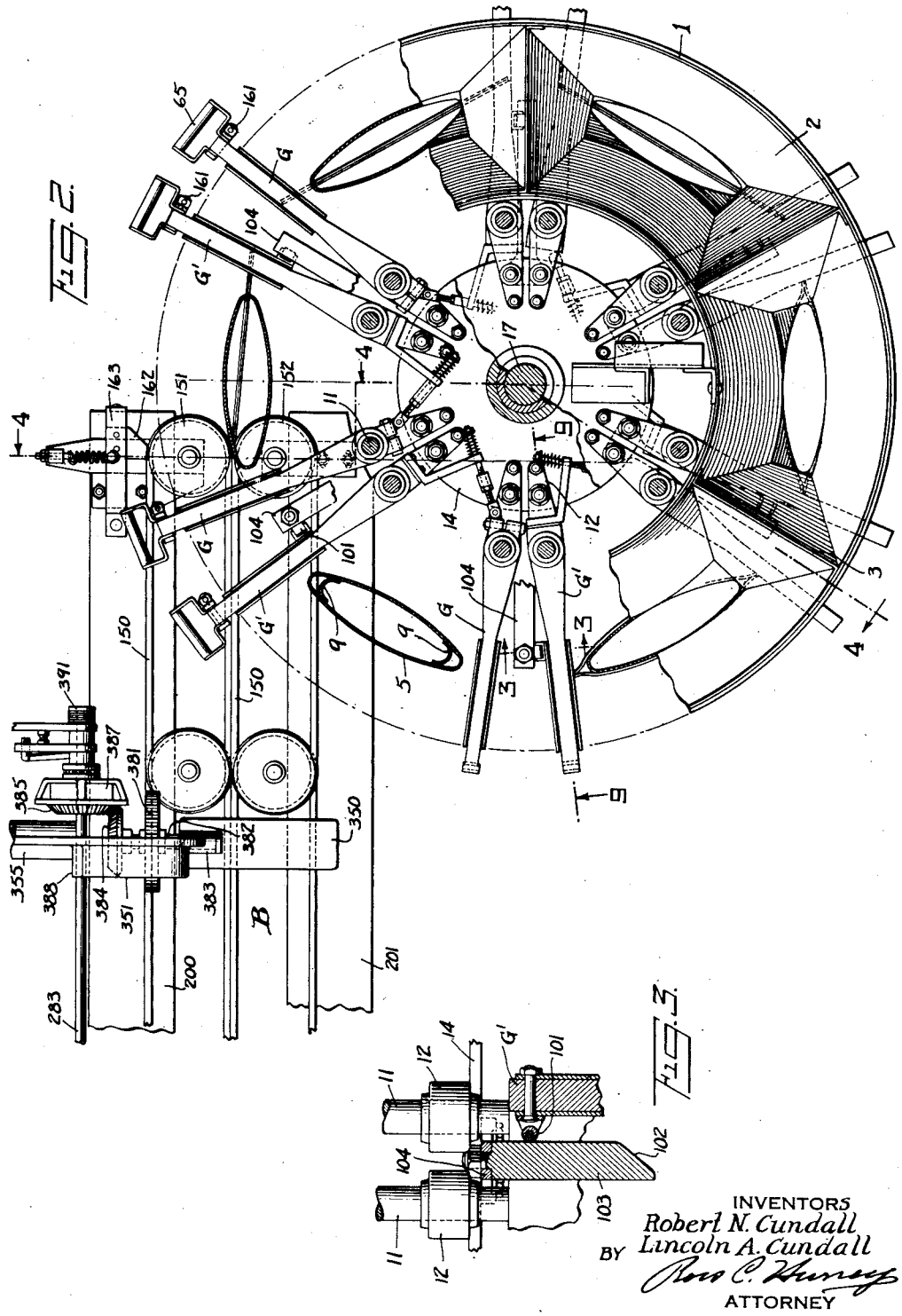

Nov. 2, 1937.　　　R. N. CUNDALL ET AL　　　2,097,449
APPARATUS FOR FILLING, SEWING, AND SEALING BAGS
Filed Sept. 9, 1933　　22 Sheets-Sheet 4
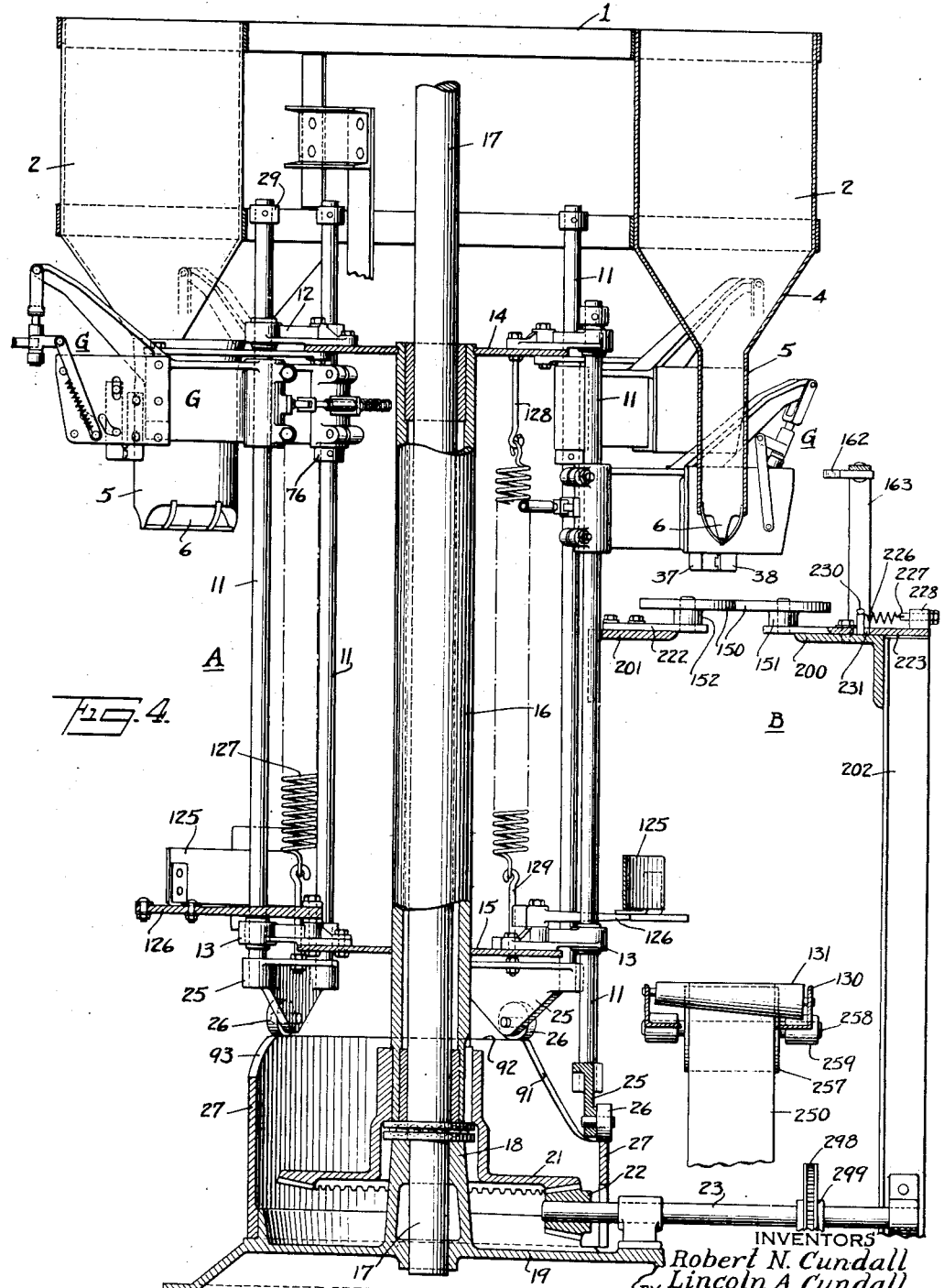
INVENTORS
Robert N. Cundall
Lincoln A. Cundall
BY
ATTORNEY

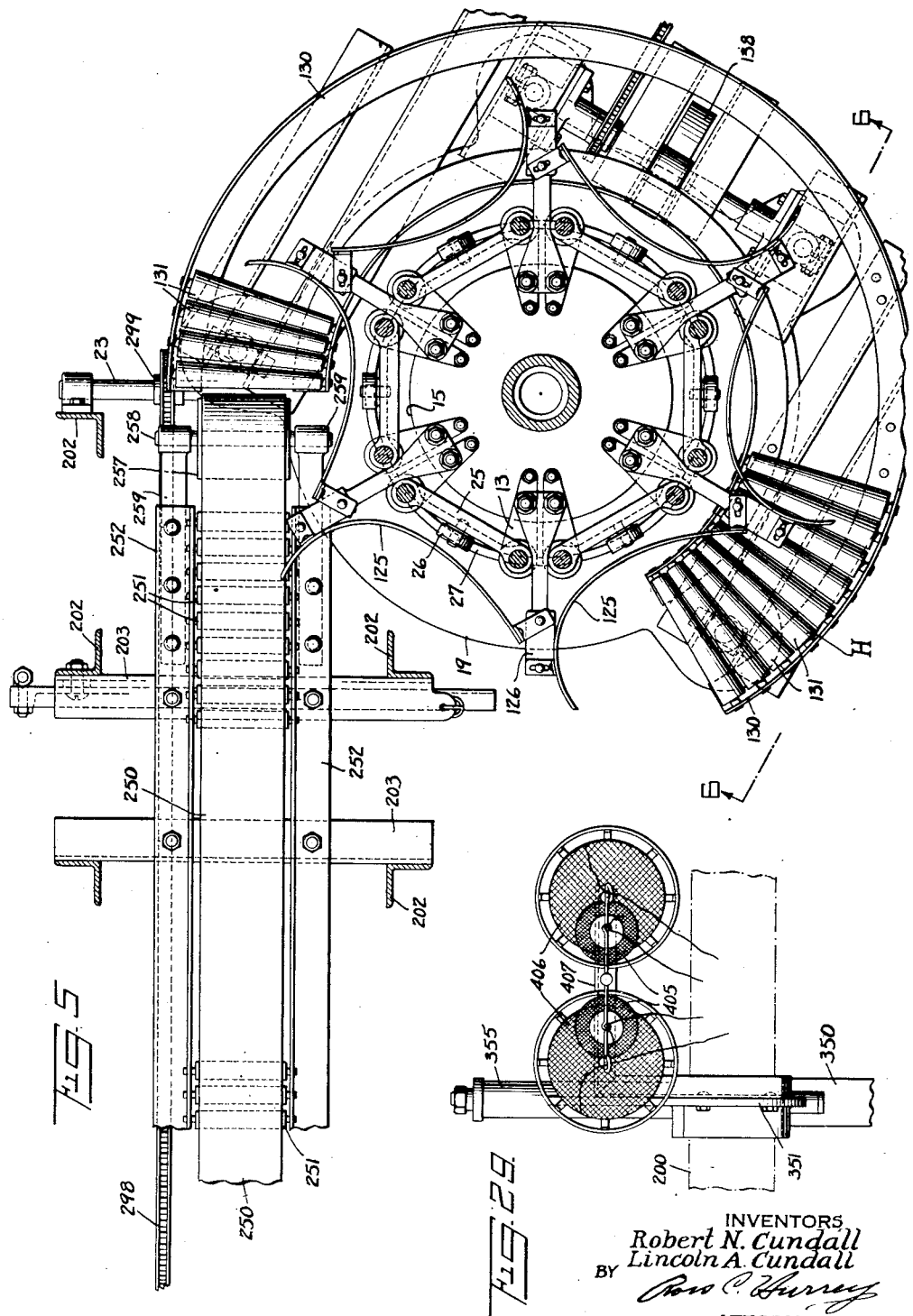

Nov. 2, 1937.   R. N. CUNDALL ET AL   2,097,449
APPARATUS FOR FILLING, SEWING, AND SEALING BAGS
Filed Sept. 9, 1933   22 Sheets-Sheet 6
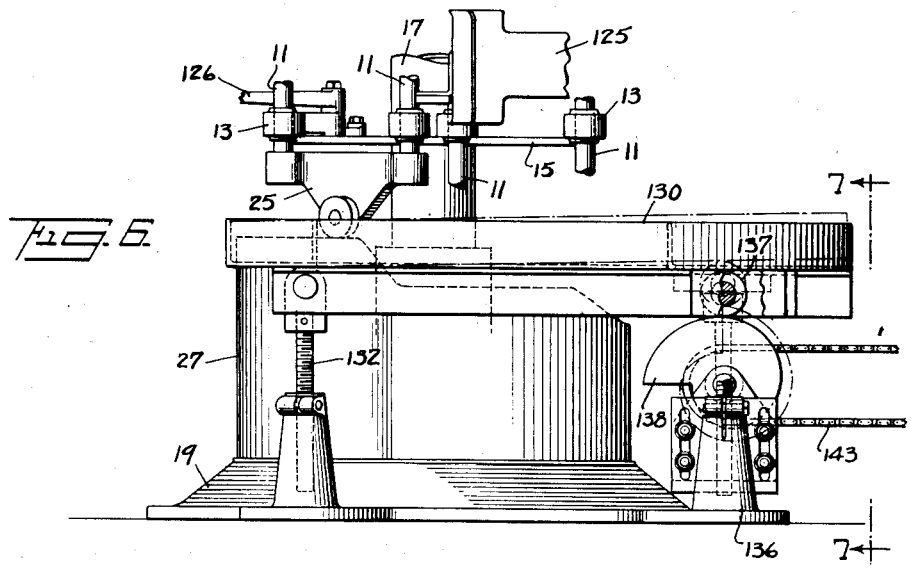
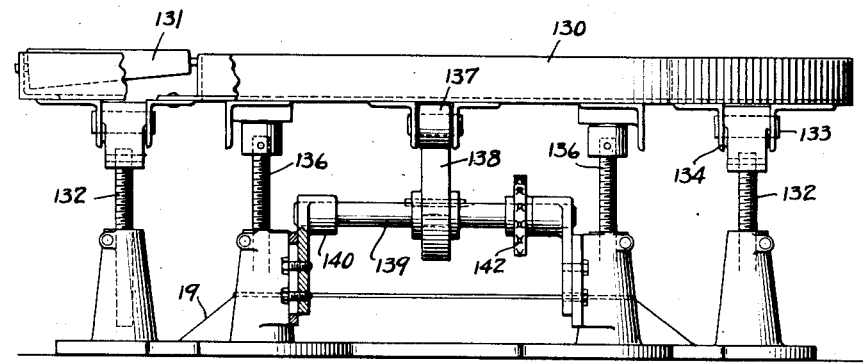
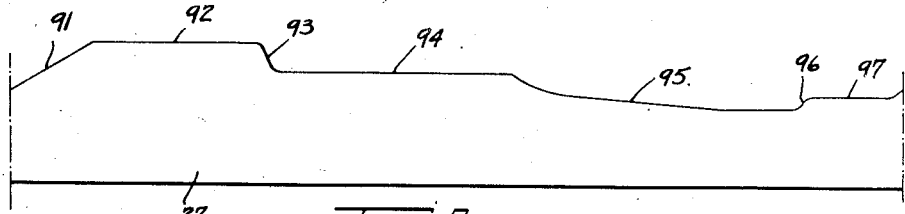
INVENTORS
Robert N. Cundall
Lincoln A. Cundall
BY
ATTORNEY

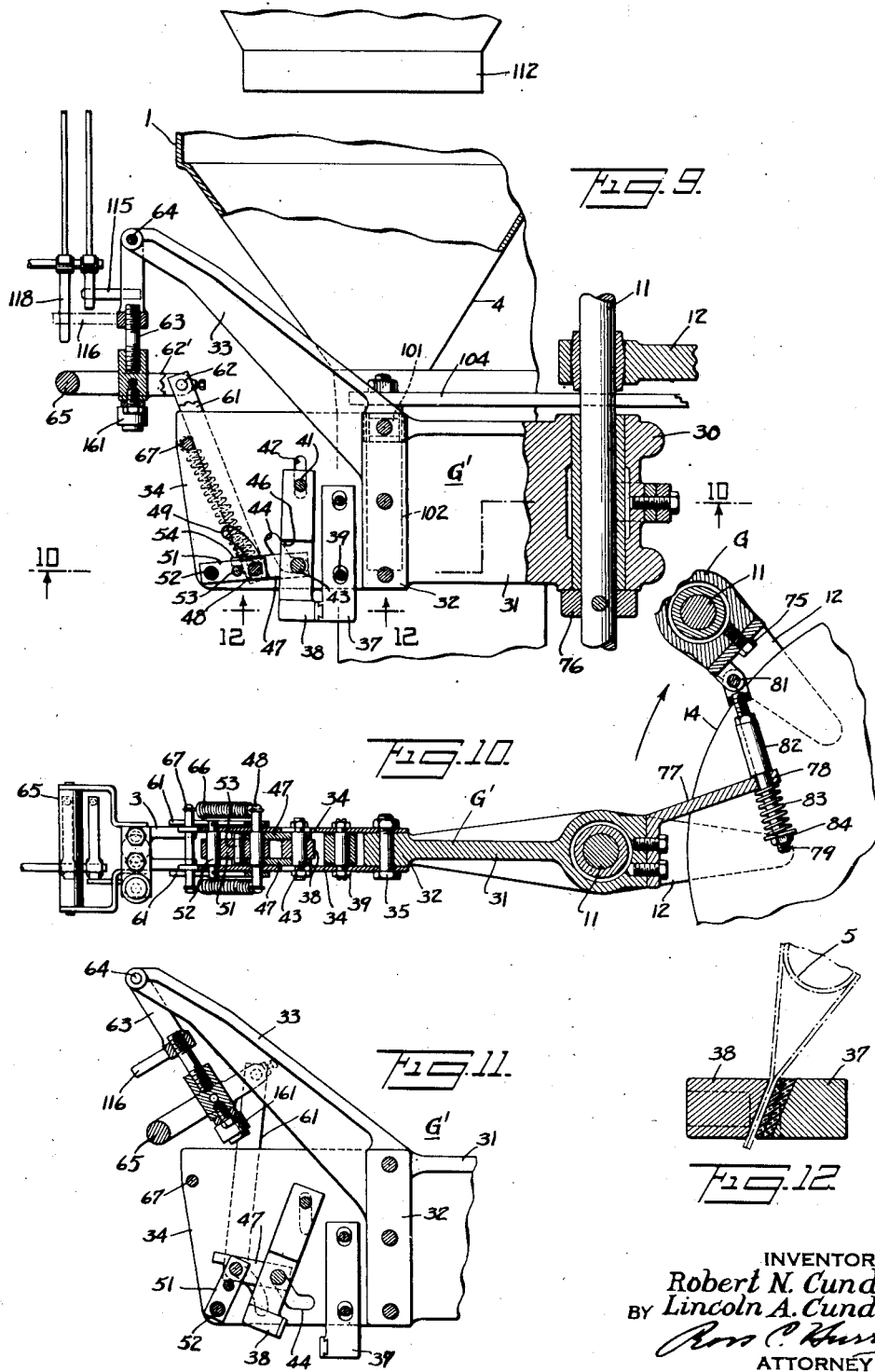

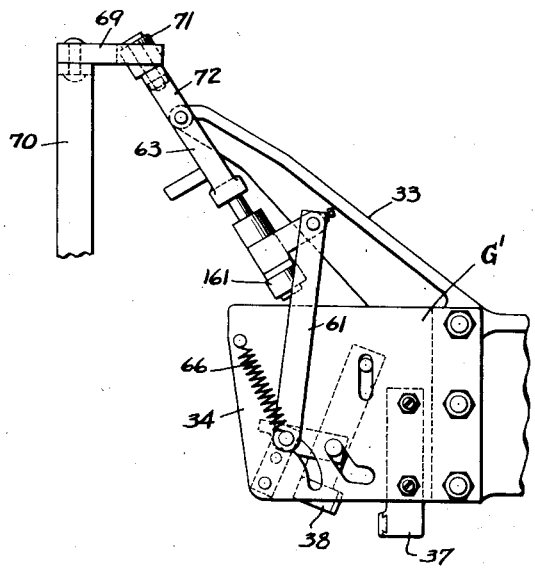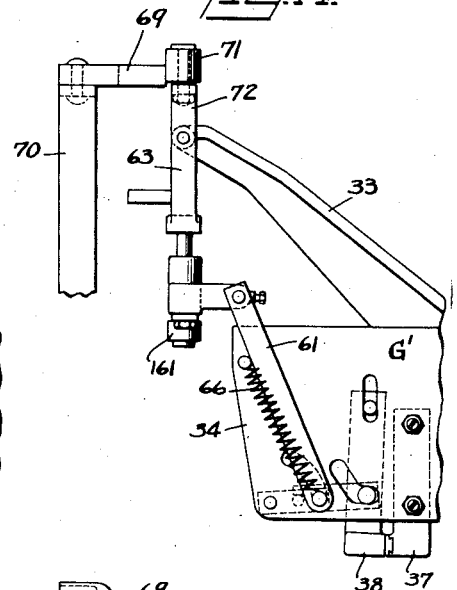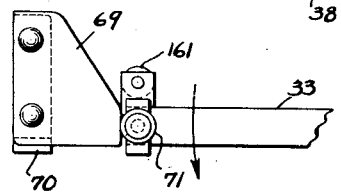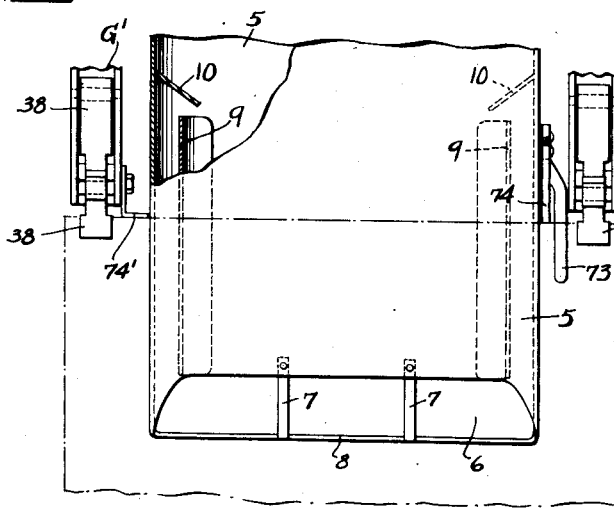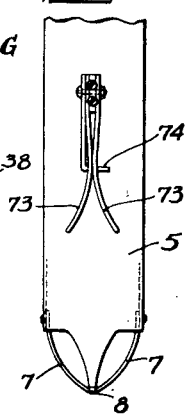

Nov. 2, 1937.    R. N. CUNDALL ET AL    2,097,449
APPARATUS FOR FILLING, SEWING, AND SEALING BAGS
Filed Sept. 9, 1933    22 Sheets-Sheet 9

INVENTORS
Robert N. Cundall
Lincoln A. Cundall
BY
ATTORNEY

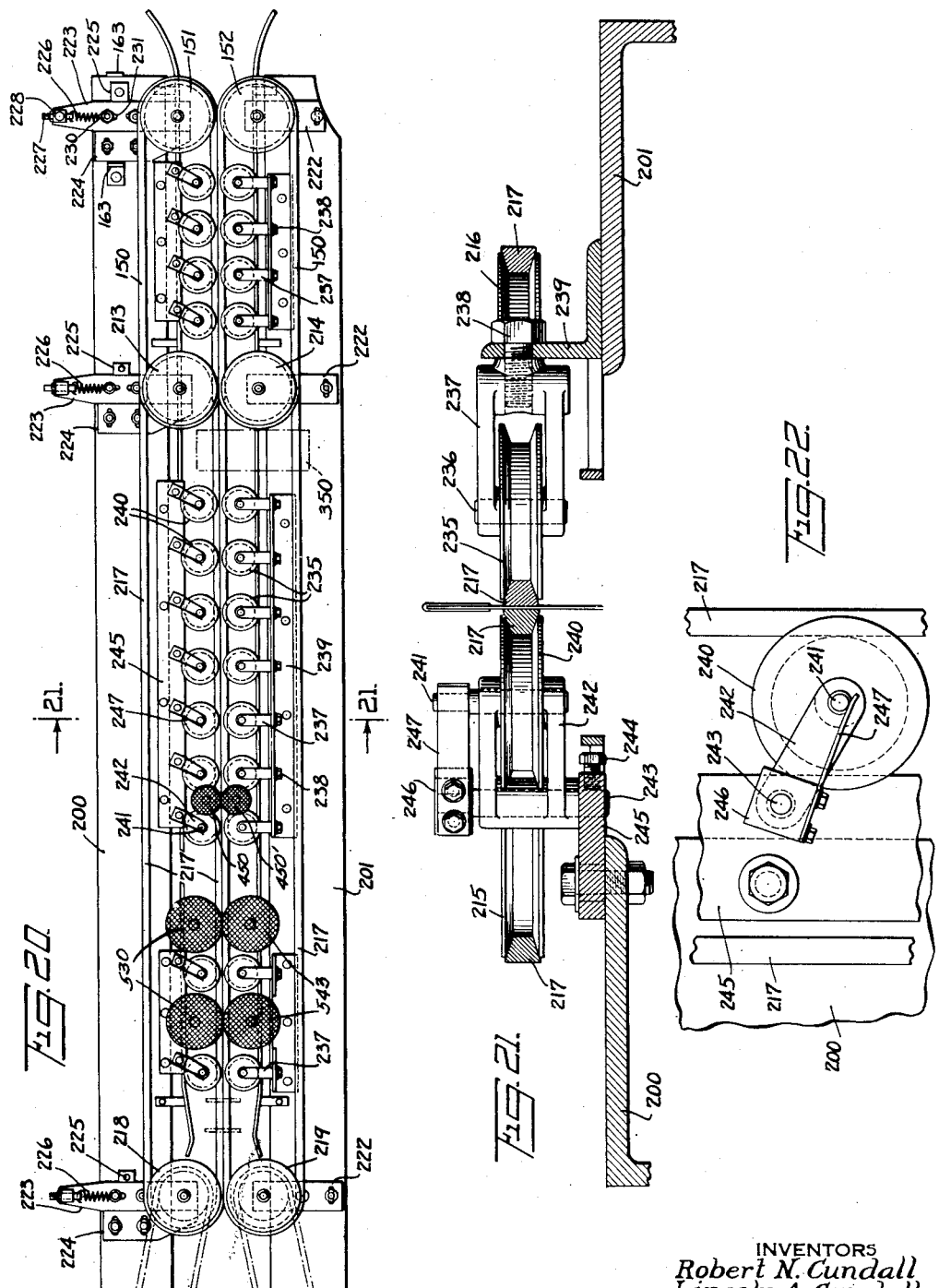

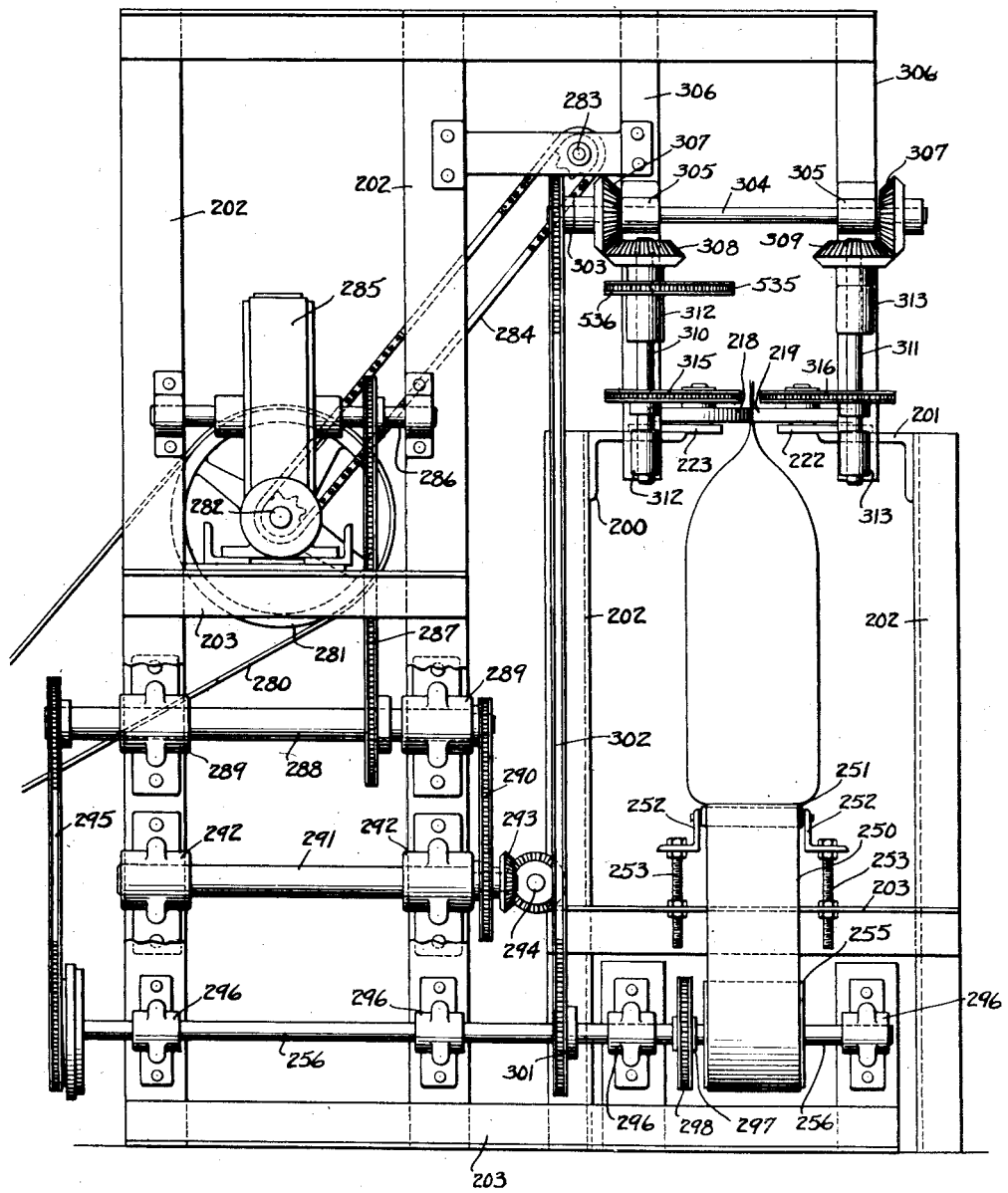

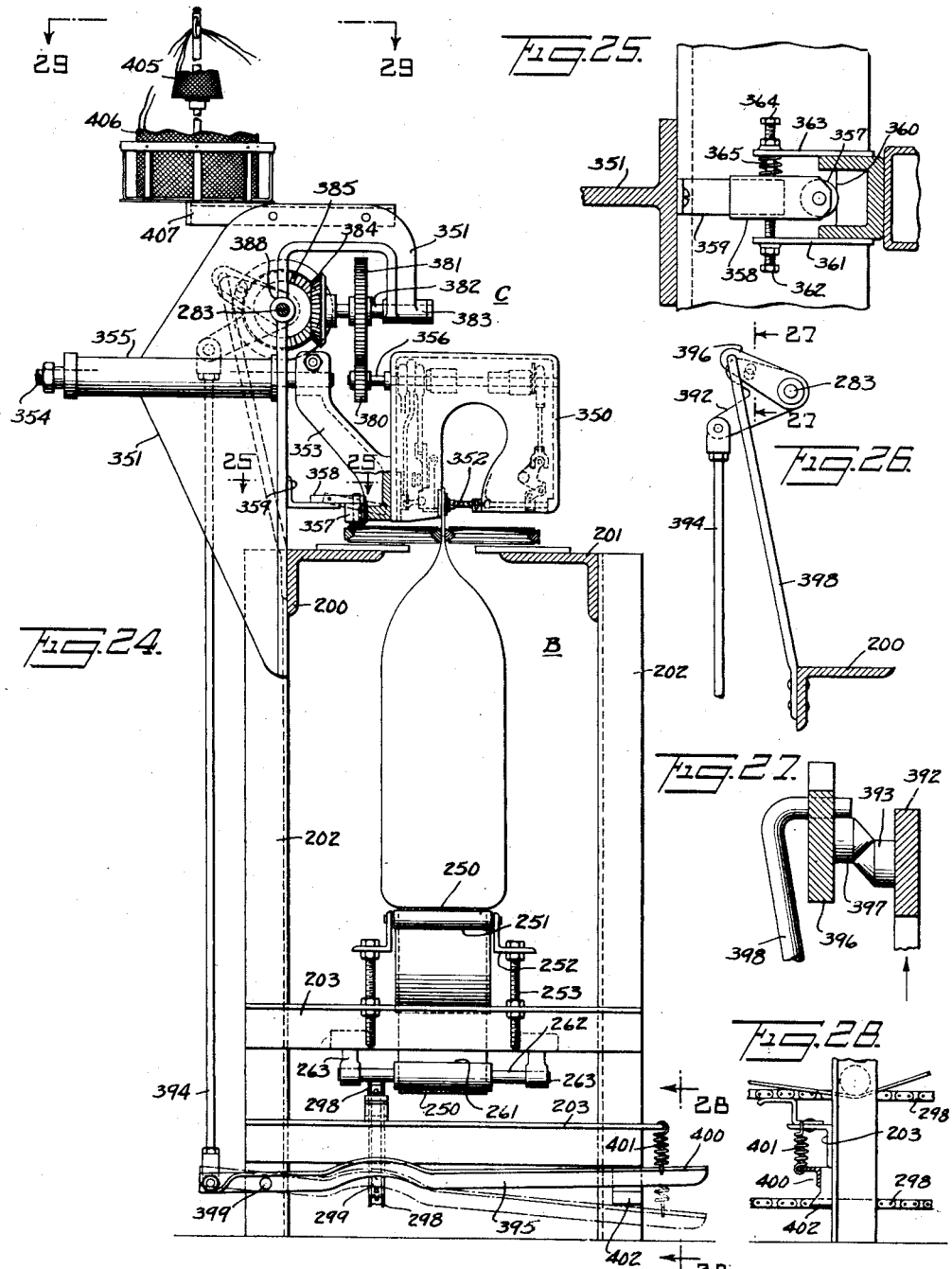

Nov. 2, 1937.  R. N. CUNDALL ET AL  2,097,449
APPARATUS FOR FILLING, SEWING, AND SEALING BAGS
Filed Sept. 9, 1933    22 Sheets-Sheet 13
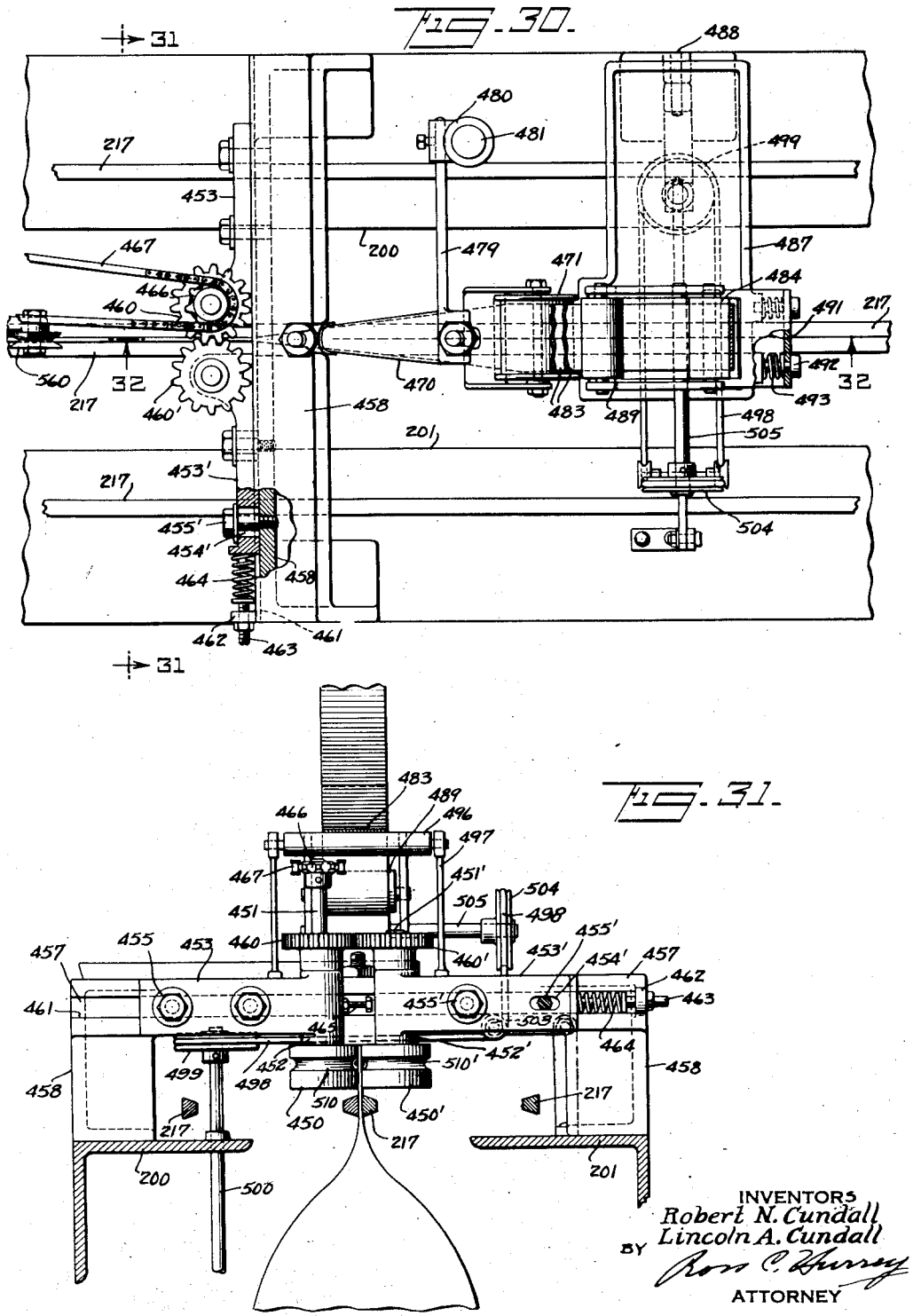
INVENTORS
Robert N. Cundall
Lincoln A. Cundall
BY
ATTORNEY

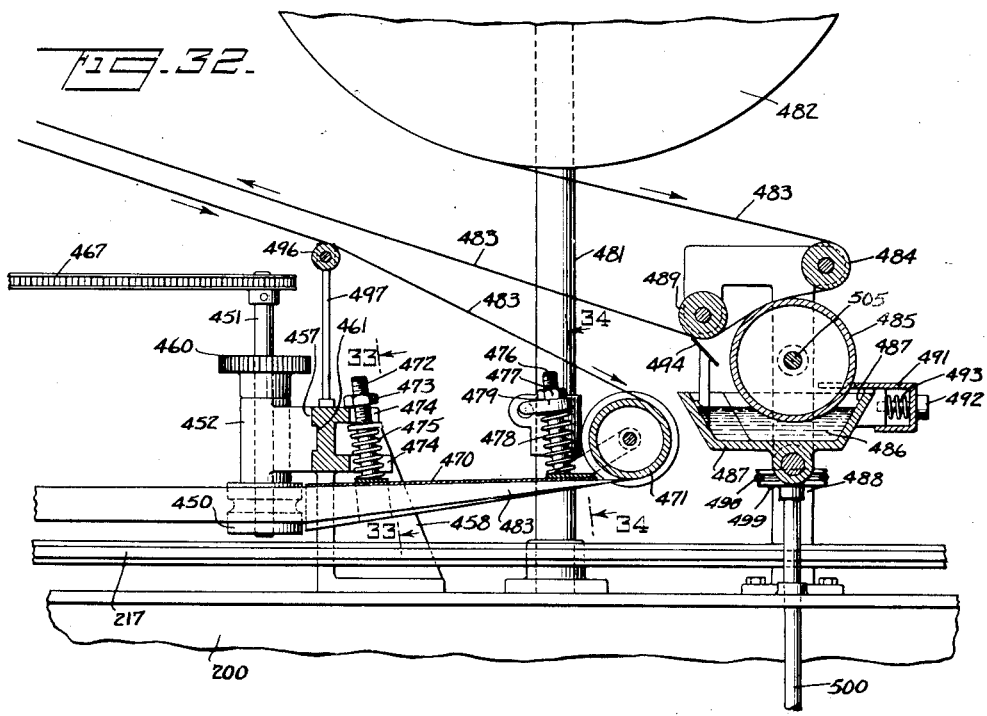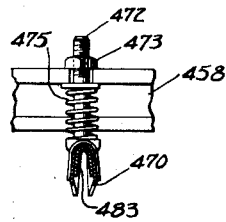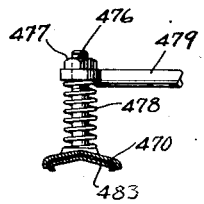

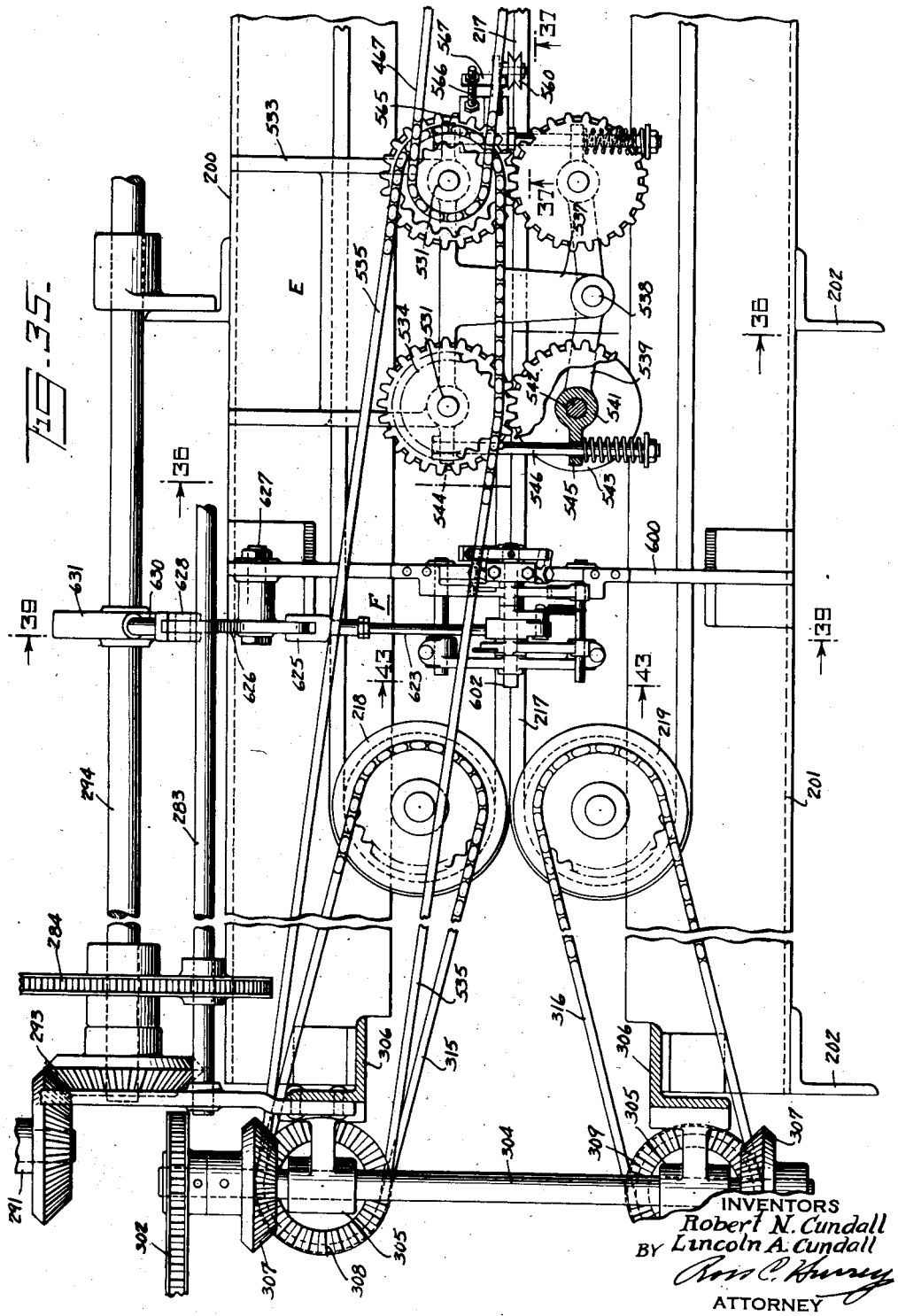

Nov. 2, 1937.  R. N. CUNDALL ET AL  2,097,449
APPARATUS FOR FILLING, SEWING, AND SEALING BAGS
Filed Sept. 9, 1933  22 Sheets-Sheet 16
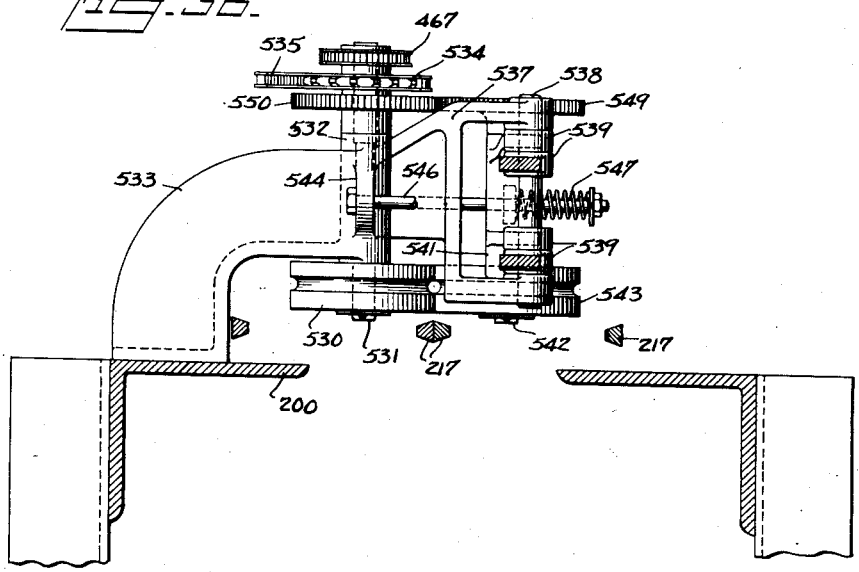
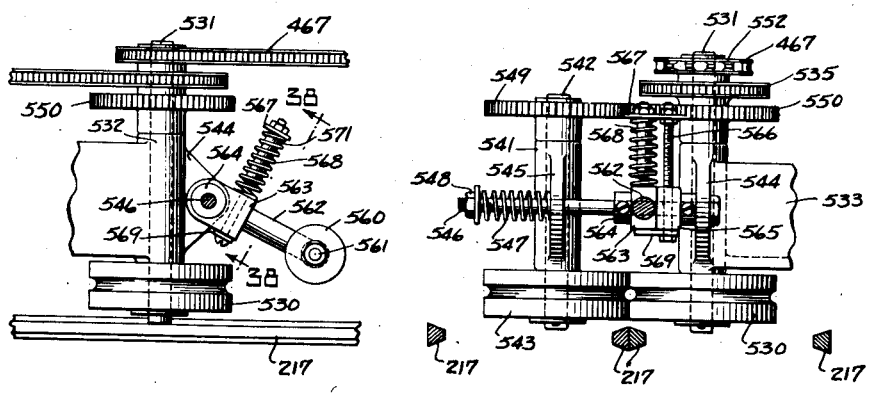
INVENTORS
Robert N. Cundall
BY Lincoln A. Cundall
ATTORNEY

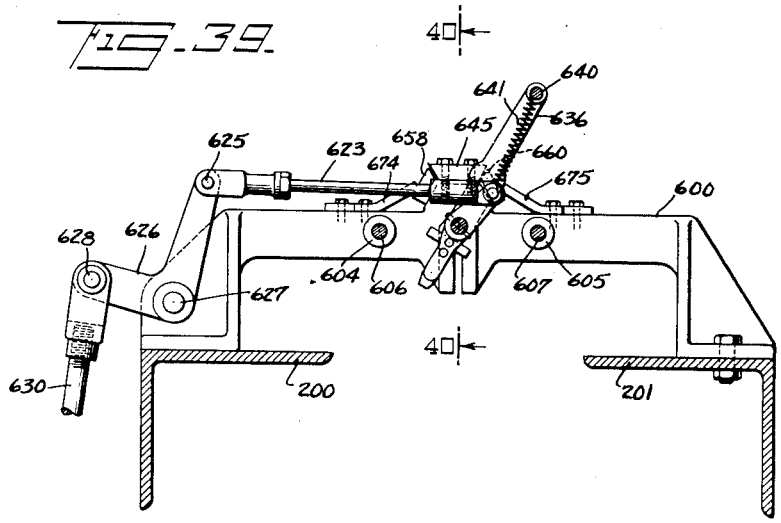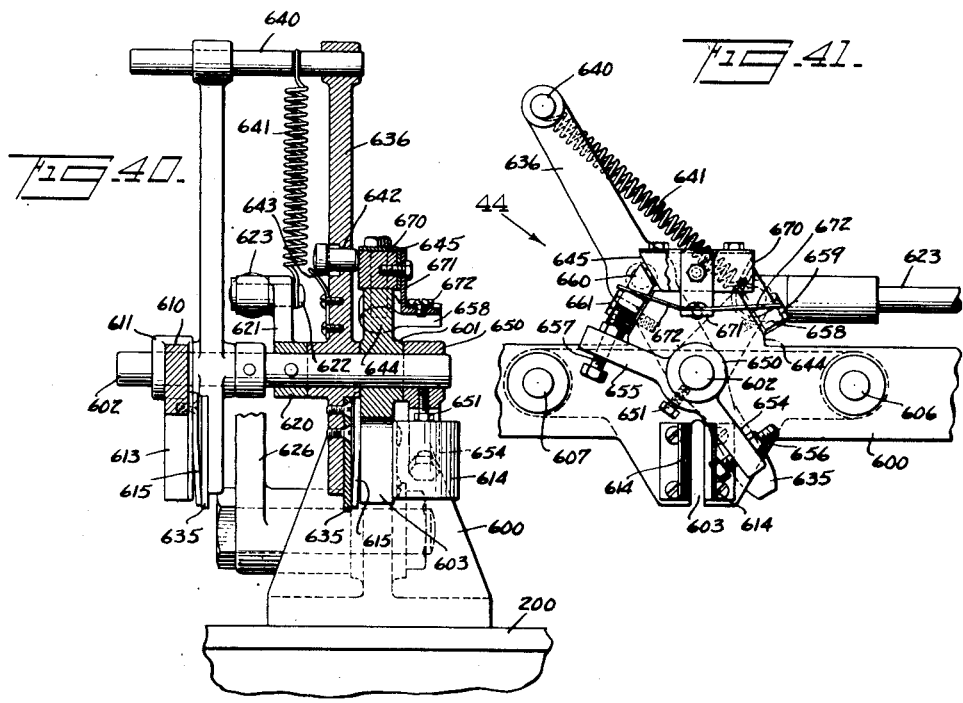

Nov. 2, 1937.    R. N. CUNDALL ET AL    2,097,449
APPARATUS FOR FILLING, SEWING, AND SEALING BAGS
Filed Sept. 9, 1933    22 Sheets-Sheet 18
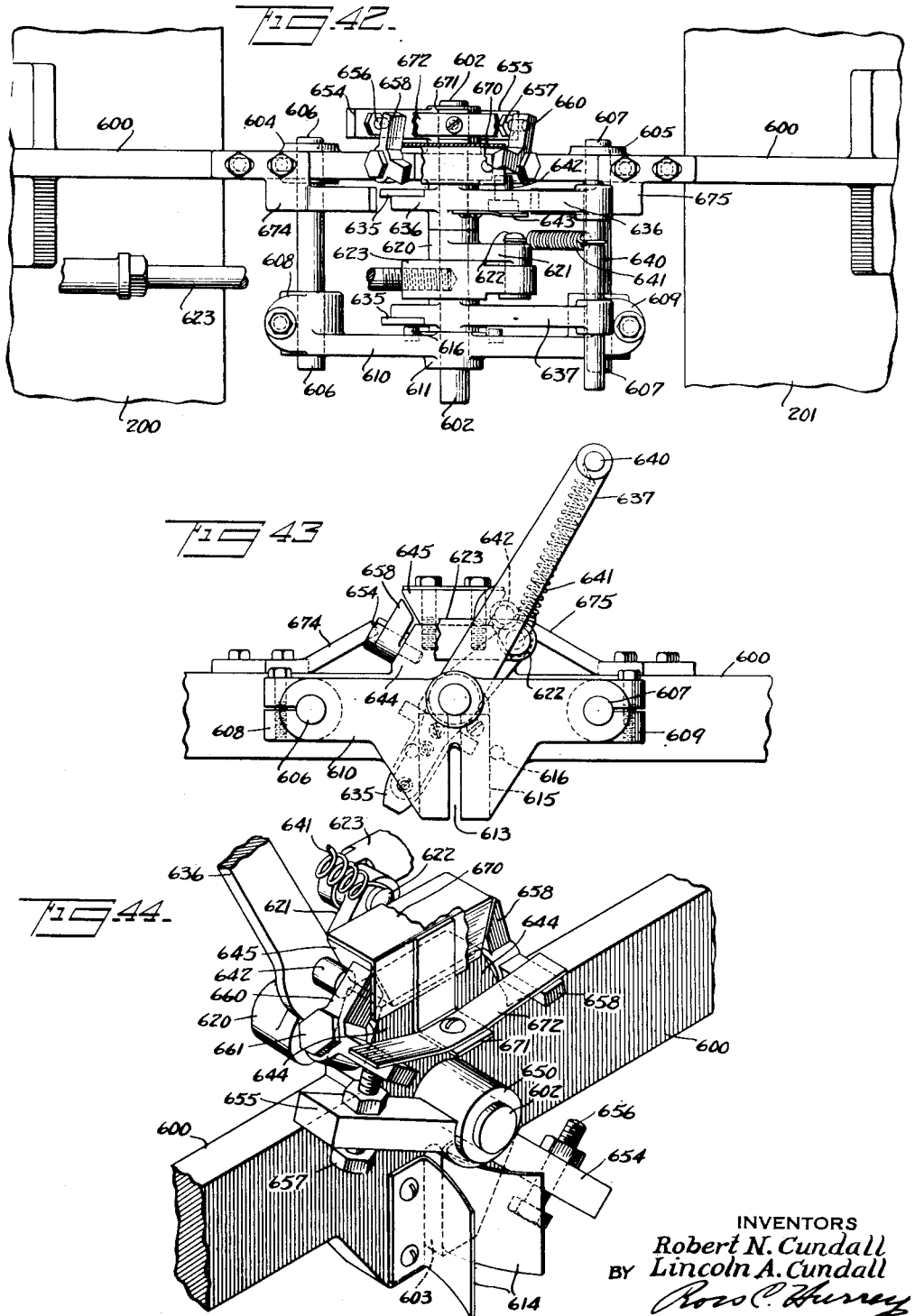

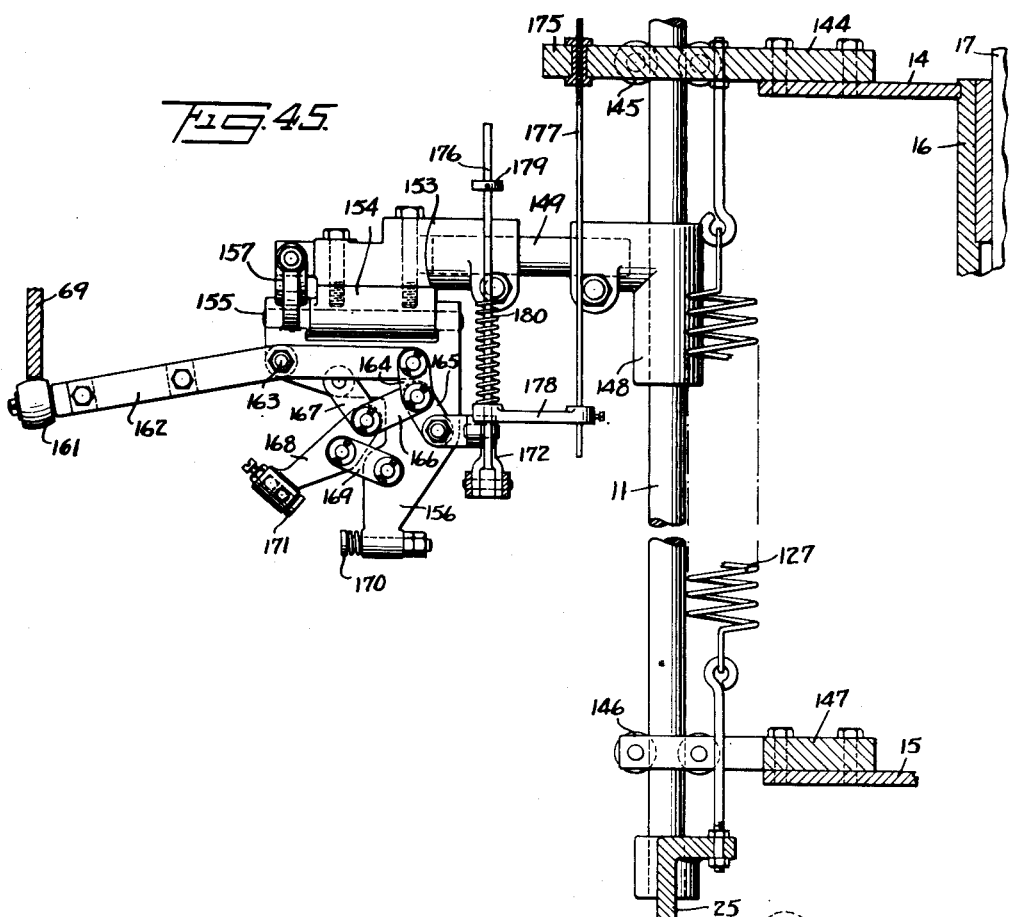

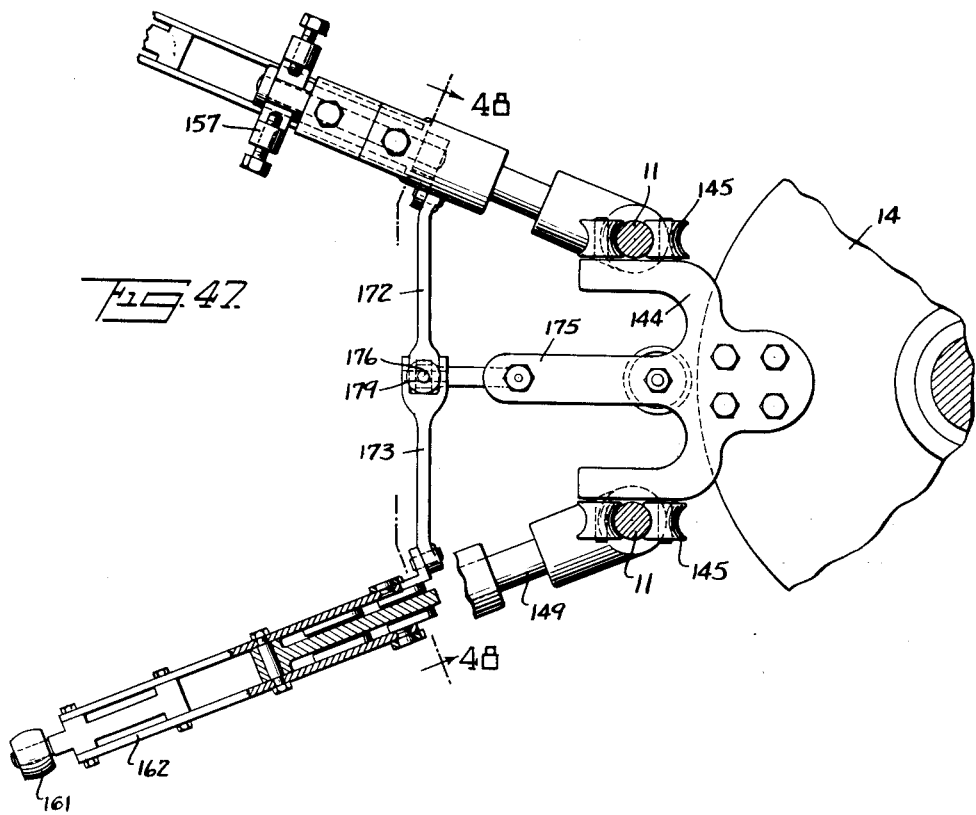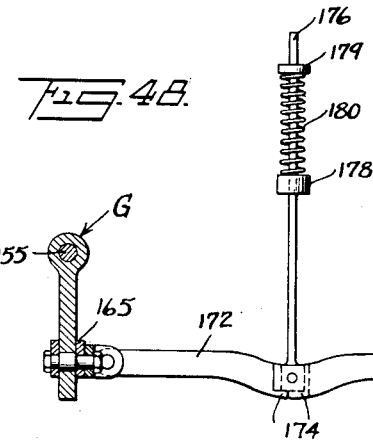

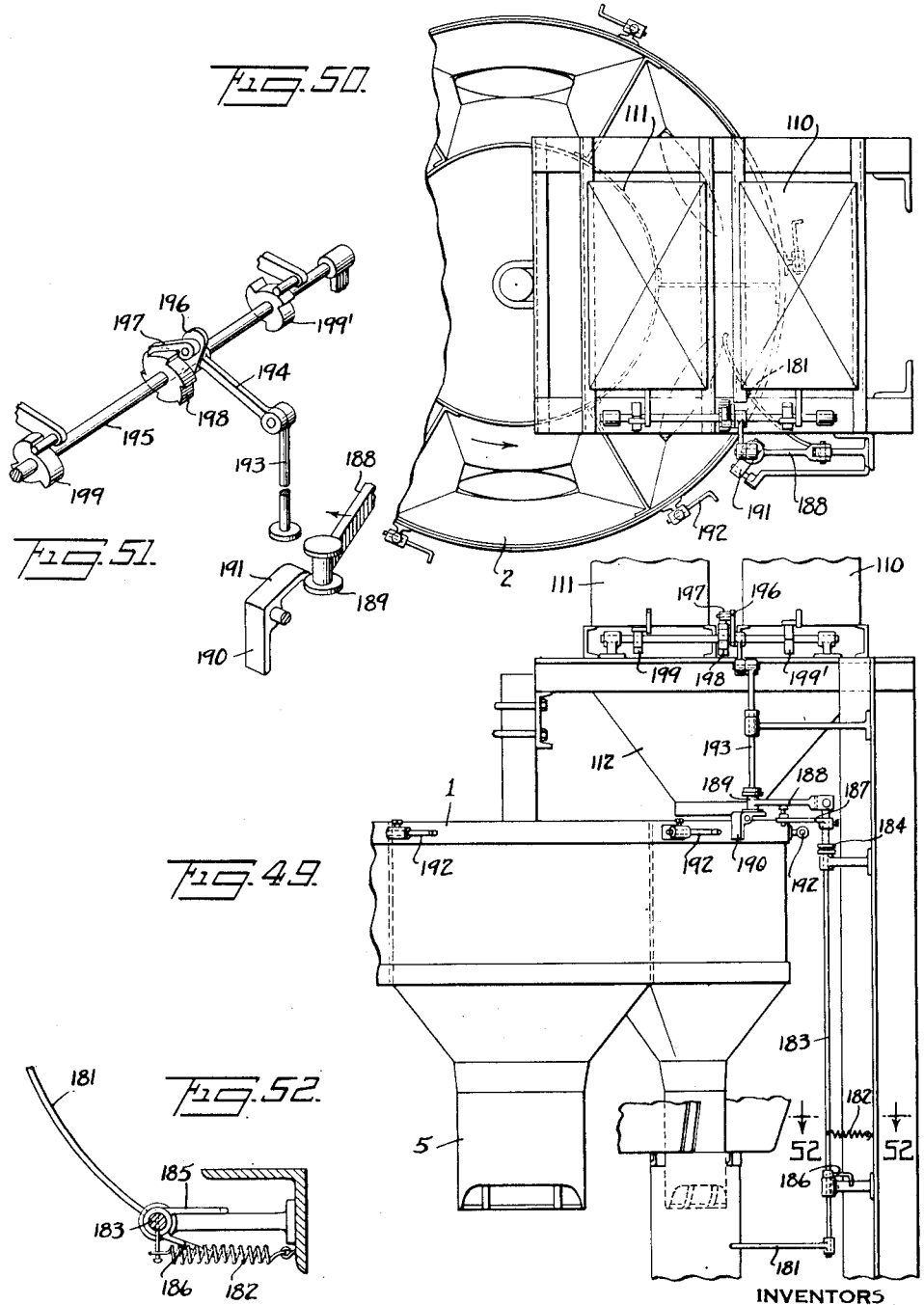

Nov. 2, 1937.   R. N. CUNDALL ET AL   2,097,449
APPARATUS FOR FILLING, SEWING, AND SEALING BAGS
Filed Sept. 9, 1933   22 Sheets-Sheet 22
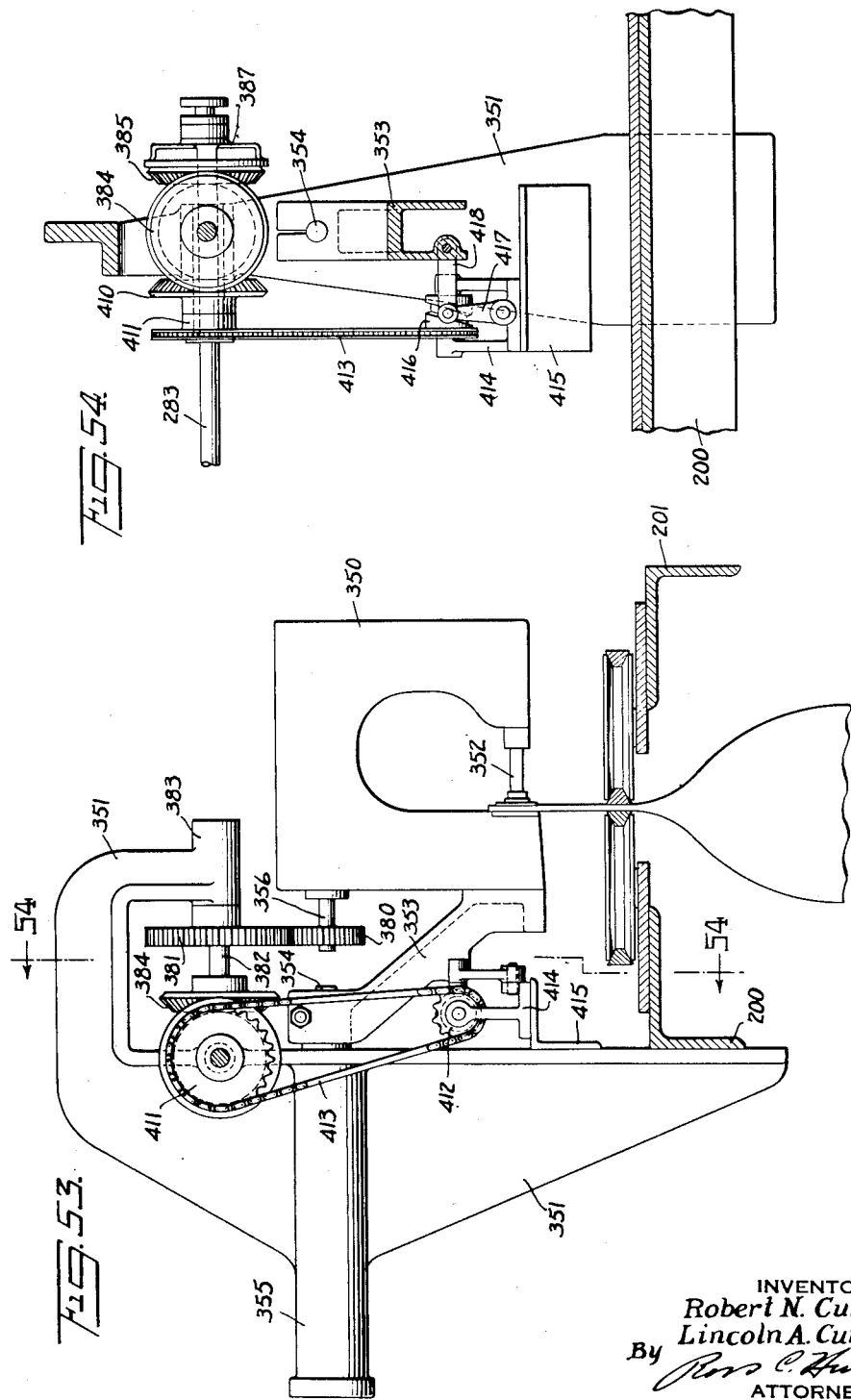
INVENTORS
Robert N. Cundall
Lincoln A. Cundall
By
ATTORNEY Patented Nov. 2, 1937

2,097,449

UNITED STATES PATENT OFFICE 2,097,449

APPARATUS FOR FILLING, SEWING, AND SEALING BAGS

Robert N. Cundall, Lackawanna, and Lincoln A. Cundall, Buffalo, N. Y., assignors to Bagpak, Inc., New York, N. Y., a corporation of Delaware Application September 9, 1933, Serial No. 688,816

50 Claims. (Cl. 226—53)

Our invention relates to apparatus for filling, sewing and sealing open-mouth bags, such, for example, as paper bags of relatively large size adapted to contain 100 lbs. more or less of cement or other pulverulent or granular material.

In the copending application of Robert N. Cundall, Serial No. 640,758, filed November 2, 1932, it is pointed out that to accomplish the filling, sewing and sealing of large size open-mouth bags by hand requires excessive and tedious labor, and that prior to the invention set forth in the aforesaid copending application there had been no satisfactory machine for accomplishing this purpose.

In the apparatus set forth in the aforesaid copending application, a series of bags to be filled are progressed through a plurality of stations by means of a conveying device operating intermittently. At various stations along the path of the bags, that is to say, at points where the bags are brought to rest by the conveyor, there are located devices for filling, closing, sewing and sealing the bags, as well as a device for severing the chain of stitches and tape by which the bags are joined as they approach the forward end of the apparatus.

In our copending application Serial No. 666,114 filed April 14, 1933, of which this application is in part a continuation, we disclose bag-filling and closing apparatus comprising a continuous conveyor adapted to progress a bag past a plurality of stations provided with means for sewing the mouth of the bag, severing the stitching following the bag, applying tape to the sewed bag mouth, severing the tape following the bag and applying pressure to the taped bag mouth to insure adherence of the tape. A single filling station is provided which is located at a distance from the rear end of the continuous conveyor, and an intermittent conveyor is provided for conveying the filled bags into the continuous conveyor.

According to the invention disclosed in said application Serial No. 666,114, the filling device and the intermittent conveyor are not necessarily operated at regular intervals, but operate in accordance with the insertion of bags to be filled and the time required for filling the bags and progressing them to the continuous conveyor. Consequently, the spacing of the series of bags along the conveyor is not necessarily uniform, and is in practice somewhat irregular, so that means are provided whereby the bags themselves actuate the various sewing, taping and severing stations.

Our present invention has for an object the provision of apparatus for filling, sewing and sealing bags, more especially paper bags adapted to contain large quantities of materials, which is simplified in various respects with respect to prior machines and which has numerous advantages in construction and operation, as will hereinafter be found to obtain.

Our invention has for further objects the provision of apparatus for the purpose indicated in which the bags are fed into a conveying device at regularly spaced intervals, the actuation of the closing and severing means being correspondingly timed but not effected by the bags themselves, also the provision of improved means for filling the bags and delivering the filled bags to the conveyor, whereby bags may be delivered rapidly and closely spaced and the capacity of the machine as a whole may be greatly increased with respect to prior machines.

Our invention has for a still further object the provision of improved means for severing a chain of stitches and tape connecting a series of spaced bags.

Our invention has for further objects such additional improvements and advantages in construction and operative results as may hereinafter be found to obtain.

According to our present invention, the bags are placed in juxtaposition to a multiple filling device adapted to rotate continuously. As the filling device rotates, each bag, after being attached thereto, is caused to be filled with a predetermined amount of material and preferably the bags are also jogged or agitated to settle the contents thereof. The filled bags are then delivered into the grip of a continuously moving conveyor.

The filled bags are progressed by the continuous conveyor at a uniform rate through devices adapted to sew and seal the bag mouths and to sever the stitches and tape connecting the spaced bags, and these devices are timed to operate in accordance with the positions of the bags passing along the conveyor which progresses them past the various operating stations.

In somewhat more detail, our invention contemplates the provision of a rotary filling device having a plurality of spouts, a corresponding plurality of pairs of grippers adapted to hold the bags, means for varying the relative positions of the grippers and the corresponding spouts to cause said spouts to enter the mouths of the bags during the filling operation, and means for biasing the grippers to maintain the mouths of the bags in a taut condition while providing for relative movement of each pair of grippers to compensate for the entry of the spouts into the bag mouths.

Our invention further contemplates numerous improvements in the construction and operation of the various units forming parts of the complete mechanism, which improvements will be described more fully hereinbelow.

In order that our invention may clearly be set forth and understood, we now describe, with reference to the drawings accompanying and forming a part of this specification, a preferred form and manner in which our invention may be embodied and operated. In these drawings, Fig. 1 is a general side elevational view of a machine for filling, closing and sealing open-mouthed bags constructed in accordance with our present invention;

Fig. 2 is a horizontal sectional view of a portion of the apparatus shown in Fig. 1, taken on the line 2—2 of Fig. 1;

Fig. 3 is a vertical sectional view of a portion of the apparatus shown on Fig. 2, taken on the line 3—3 of Fig. 2;

Fig. 4 is a vertical sectional view of a portion of the apparatus shown in Figs. 1 and 2, taken on the line 4—4 of Fig. 2;

Fig. 5 is a horizontal sectional view of a portion of the apparatus shown in Figs. 1, 2 and 4 taken on the line 5—5 of Fig. 1;

Fig. 6 is an elevational view of a portion of the apparatus shown in Figs. 1 and 5, taken on the line 6—6 of Fig. 5;

Fig. 7 is an elevational view of a portion of the apparatus shown in Figs. 1, 5 and 6, taken on line 7—7 of Fig. 6;

Fig. 8 is a developed view of a cam forming a portion of the apparatus shown in Figs. 1, 4 and 5;

Fig. 9 is a view, partly in elevation and partly in vertical section, of a portion of apparatus shown in Figs. 1, 2 and 4, taken on the line 9—9 of Fig. 2;

Fig. 10 is a horizontal sectional view of the apparatus shown in Fig. 9, taken on the line 10—10 of Fig. 9;

Fig. 11 is a view similar to Fig. 9, with parts of the apparatus shown in different positions;

Fig. 12 is a horizontal sectional view of a portion of the apparatus shown in Fig. 9, taken on the line 12—12 of Fig. 9;

Fig. 13 is a side elevational view of a modified form of the apparatus shown in Fig. 9;

Fig. 14 is a view taken similarly to Fig. 13, but showing parts in a different position;

Fig. 15 is a plan view of a portion of the apparatus shown in Fig. 14;

Figs. 16 and 17 are side and end elevational views, respectively, of a portion of the apparatus shown on Figs. 1 and 4, illustrating more particularly the spouts through which the bags are filled;

Fig. 20 is a plan view of the main conveying apparatus shown in Fig. 1, with portions of the remaining apparatus removed for the sake of clarity;

Fig. 21 is a vertical sectional view taken on the line 21—21 of Fig. 20;

Fig. 22 is a plan view of a portion of the apparatus shown in Figs. 20 and 21;

Fig. 23 is an elevational view of one end of the machine illustrated in Fig. 1, taken on the line 23—23 of Fig. 1, and illustrating particularly the driving mechanism for the machine;

Fig. 24 is a vertical sectional view of a portion of the apparatus shown in Fig. 1, taken on the line 24—24 of Fig. 2, and illustrating in further detail a sewing machine and means for operating the same which form a part of the machine as a whole;

Fig. 25 is a horizontal sectional view of a portion of the apparatus shown in Fig. 24, taken on line 25—25 of Fig. 24;

Fig. 26 is an elevational view of a portion of the apparatus shown in Fig. 24;

Fig. 27 is a vertical sectional view of a portion of the apparatus shown on Figs. 24 and 26, taken on the line 27—27 of Fig. 26;

Fig. 28 is an elevational view of a portion of the apparatus shown in Fig. 24, taken on the line 28—28 of Fig. 24;

Fig. 29 is a plan view of a portion of the apparatus shown in Fig. 24, taken on the line 29—29 of Fig. 24;

Fig. 30 is a horizontal sectional view of tape-applying mechanism illustrated in Fig. 1, taken on the line 30—30 of Fig. 1;

Figure 19:
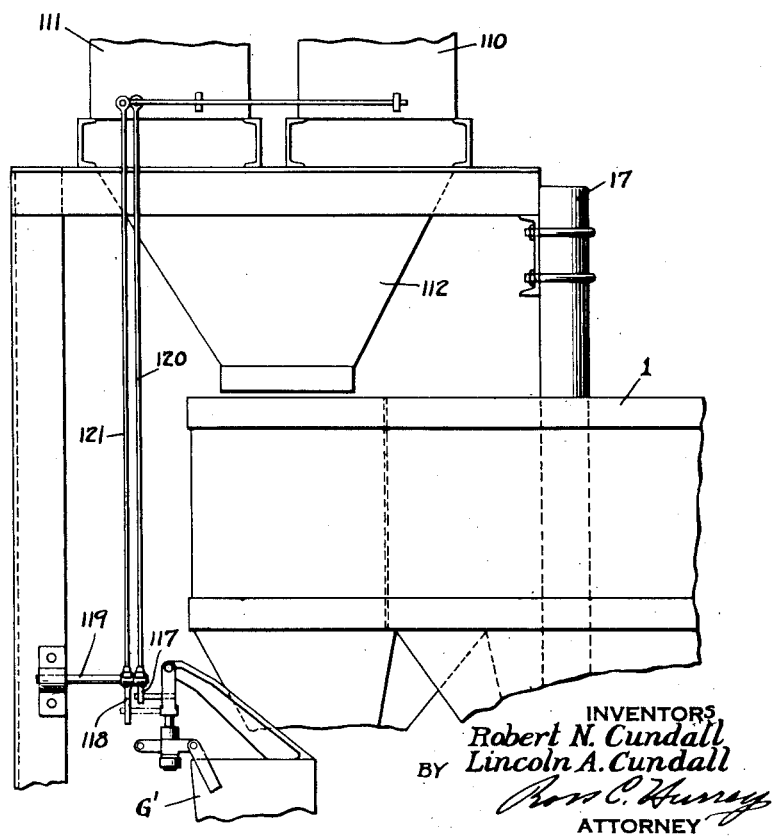

Figs. 31 and 32 are vertical sectional views of portions of the apparatus shown in Fig. 30, taken on the lines 31—31 and 32—32, respectively, of Fig. 30;

Figs. 33 and 34 are vertical sectional views of a tape-folding guide shown in Fig. 32, taken on the lines 33—33 and 34—34, respectively, of Fig. 32;

Fig. 35 is a plan view of a portion of the apparatus shown in Fig. 1, taken on the line 35—35 of Fig. 31, and illustrating in further detail the tape-squeezing mechanism, a shear and a portion of the drive mechanism;

Fig. 36 is a vertical sectional view of a portion of the tape-squeezing mechanism shown in Fig. 35, taken on line 36—36 of Fig. 35;

Fig. 37 is a side elevational view of a portion of the apparatus shown in Fig. 35, taken on the line 37—37 of Fig. 35;

Fig. 38 is a vertical sectional view of a portion of the apparatus shown on the Fig. 37, taken on the line 38—38 of Fig. 37;

Fig. 39 is a vertical sectional view of the shear mechanism shown in Figs. 31 and 35, taken on the line 39—39 of Fig. 35;

Fig. 40 is a vertical sectional view of a portion of the shear mechanism shown on Fig. 39, taken on the line 40—40 of Fig. 39;

Fig. 41 is an elevational view of a portion of the apparatus shown on Fig. 39, taken from the opposite side thereof;

Fig. 42 is a plan view of a portion of the apparatus shown in Figs. 1, 35 and 39 to 41, with parts thereof broken away;

Fig. 43 is an elevational view of a portion of the apparatus shown in Figs. 31 and 35, taken on the line 43—43 of Fig. 35;

Fig. 44 is a perspective view of a portion of the shear mechanism shown in Figs. 1, 35, and 39 to 43, as viewed in the direction of the arrow 44 of Fig. 41;

Fig. 45 is a section in elevation similar to Fig. 9 and showing a modified form of gripping device;

Fig. 46 is a view of a portion of the mechanism of Fig. 45, showing the gripping jaws in operation;

Fig. 47 is a section of the machine looking down on Fig. 45, and showing the relationship of a pair of the modified grippers;

Fig. 48 is a section taken along the line 48—48 and illustrating a phase of the operation of the modified grippers;

Fig. 49 is a partial view in elevation similar to Fig. 19 and illustrating a modified form of scale tripping device;

Fig. 50 is a top plan view of Fig. 49;

Fig. 51 is a perspective view of a portion of the modified scale tripping device;

Fig. 52 is a section taken along the line 52—52 of Fig. 49;

Fig. 53 is a view in elevation of a form of sewing head oscillating device, the relationship of which to other parts of the machine may best be seen by comparison with Fig. 24; and Fig. 54 is a section in elevation taken along line 54—54 of Fig. 53.

Similar reference numerals designate similar parts in each of the several views of the drawings.

Referring now to the drawings and more particularly to Fig. 1 thereof, it will be observed that the machine of our invention is an assembly of various cooperating units adapted to perform various functions incident to the filling, closing, sewing and sealing of open-mouth bags. In the instance illustrated in the drawings, the bags are first filled by means of a turret or rotary device A. After having been inserted by the operator, the filled bags are then transferred by the rotary device A into the grip of a main conveying device B, the mouths of the bags being held in a tightly closed position as the bags move forward along the conveyor B. The bags then traverse a sewing station C, where the mouths of the bags are stitched, and then pass through a tape-applying station D where folded tape coated with adhesive material is applied over the sewed mouths of the bags.

The sewed and taped bags then pass through a tape-squeezing station E where the taped mouths of the bags are subjected to considerable pressure in order to assure adherence of the tape to the bag mouths.

As will be shown hereinbelow, the operation of the rotary device A is such that the bags are delivered to the conveyor B in a uniformly spaced series and pass through the conveyor B without displacement relative to each other. For this reason it is unnecessary to provide separate devices for severing the chain of stitches and the tape which connect the several bags and in the present instance the stitching and tape are simultaneously severed as the bags, after leaving the tape-squeezing station E, pass through a shear or severing device F, the operation of which is so timed with regard to the rotation of the device A, that the tape and stitching joining each bag to the bag following it are automatically severed at this point.

The bags then pass out of the machine at the extreme left as viewed in Fig. 1.

*Rotary filling and feeding device*

The details of the device A are illustrated in Figs. 1 to 19. It will be seen from these figures that there is provided an annular hopper 1 which is separated into a plurality of compartments 2 by means of vertical partitions 3. In the instance shown in the drawings, there are six partitions 3 and six compartments 2. Each of the compartments 2 is provided with a more or less funnel shaped extension 4 terminating in a depending spout 5. The cross-sectional configuration of each of the spouts 5 is that of a flat oval thus permitting the bags to be readily drawn up over the lower open ends 6 of the spouts 5. As shown in Figs. 16 and 17 the open ends 6 of the spouts 5 are cut away at the sides thereof and are provided with guides 7 and end pieces 8 for the purpose of facilitating the entry of the spouts 5 into the open mouths of the bags to be filled. The filling spouts 5 are preferably formed with vents 9 extending upward to allow for the escape of air from the bag as the charge is dumped thereinto. The vents 9 are formed merely by adding false walls to the oval ends of the spout. Guards or plates 10 (Fig. 16) extend outward over the upper ends of the vents to prevent material from falling through the vents and to allow the free escape of air.

The bags to be filled are supported from gripping devices G and G', a pair of which are provided for each of the spouts 5.

The grippers G are positioned ahead of, and the grippers G' are positioned behind the respective spouts 5. The gripping devices G and G' are mounted upon a corresponding plurality of vertical shafts 11 which are supported in bearings 12 and 13 fastened to horizontal plates 14 and 15, respectively. The plates 14 and 15 are in turn attached to the upper and lower ends, respectively, of a sleeve 16 journaled about a vertical stationary column shaft 17, the lower end of which is supported by means of a combined vertical and horizontal support bearing 18 forming a part of a base casing 19. The lower end of the sleeve 16 is keyed to a bevel gear 21 which meshes with a spur gear 22 mounted on a horizontal shaft 23.

The vertical shafts 11 are mounted for vertical sliding movement in the bearings 12 and 13 and each pair of the shafts 11 corresponding to the grippers G and G' pertaining to one of the spouts 5 are connected together by means of a member 25 carrying a roller 26 adapted to ride on the upper surface of a circular base cam 27. The upper ends of the shafts 11 may conveniently be provided with collars 29 for limiting the downward travel of the shafts 11.

Each of the gripping devices G and G' comprises a sleeve 30 mounted on one of the shafts 11 and having an outwardly extending member 31 terminating in a flange 32. Extending outwardly and upwardly from the upper portion of each of the flanges 32 is provided an arm 33 while a pair of outwardly and horizontally extending plates 34 are attached to the outer surfaces of each of the flanges 32 by means of fastenings 35.

Lying between the plates 34 there are provided stationary gripping members 37 and movable gripping members 38. Each of the stationary gripping members 37 is positioned by means of eccentric pins 39 which engage the adjacent side plates 34, these pins being made eccentric for the purpose of effecting slight variations in the positions of the grippers 37. Each of the movable grippers 38 carries a pair of outwardly extending pins 41 adapted to pass through vertical slots 42 in the side plates 34, and a pair of outwardly extending pins 43, the ends of which are adapted to pass through bent slots 44 in the side plates 34.

The movable grippers 38 are provided with cut-away portions 46 at the sides thereof adjacent to the pins 43 which provide space for the ends of members 47, one of which lies on each side of each of the grippers 38. The portions of the pins 43 lying between the cut-away portions 46 of the movable grippers 38 and the corresponding side plates 34 pass through the members 47. The other ends of each pair of members 47 are adapted to engage a pin 48, the ends of which pass through curved slots 49 in the side plates 34.

The pins 48 which extend through and beyond the plates 34 on either side thereof are mounted in the ends of members 51, the other ends of which are pivotally attached by means of pins 52 to the plates 34, the curved slots 49 being radially disposed with respect to the pins 52.

The members 51 also carry pins 53, the outer ends of which are adapted to be engaged, in the position shown in Fig. 9, by lugs 54 on the ends of the members 47.

The outer ends of the pins 48 which extend beyond the plates 34 are pivotally attached by means of arms 61 to pins 62 secured in lugs 62' extending inwardly from the lower ends of operating levers 63, the upper ends of which are pivotally attached at 64 to the upper and outer ends of the arms 33. The lower ends of the operating levers 63 also carry outwardly extending operating handles 65.

Springs 66 are provided, the lower ends of which are attached to the extreme outer ends of the pins 48 and the upper ends of which are attached to pins 67 fastened to and extending through the plates 34, the pins 67 being located as close as possible to the arms 61, in the position in which the parts are shown in Fig. 9. It will be observed that, in the position of Fig. 9, the pins 62 occupy positions on dead center or a little beyond dead center with respect to imaginary lines drawn between the centers of the pins 48 and the pivots 64.

In this position, with the pins 48 lying in the lower ends of the paths of travel defined by the slots 49, the members 47 and the members 51 are caused to exert pressure upon the movable grippers 38, forcing the lower end of the grippers 38 against the lower ends of the stationary grippers 37, the jaws of the grippers being held together under considerable pressure on account of the dead center or toggle relation between the pins 48 and pivots 64 and the arms 61 and 63.

However, when any one of the handles 65 is pushed inwardly, the springs 66 acting upon the pin 48 raise the latter to the upper end of the path of travel defined by the slots 49, thus drawing the parts into the position in which they are shown in Fig. 11 and separating the lower ends of the grippers 38 and 37.

When so desired, as shown in Figs. 13, 14 and 15, means are provided for automatically engaging the grippers 37 and 38. Such means comprises a cam 69 secured to a support 70, which is conveniently attached to a portion of the frame of the machine. The cam 69 is adapted to engage rollers 71 mounted on extensions 72 of the operating levers 63, which act through the arms 61 to control the position of the movable grippers 38 as will be shown hereinbelow.

As the grippers G and G' approach the position in which the bags are to be attached, the movable grippers 38 are withdrawn from the fixed grippers 37, as shown in Fig. 13, and the rollers 71 occupy the outer position illustrated in Fig. 13. It will be observed from inspection of Fig. 13 that in this position the rollers 71 engage the cam 69 and this engagement throws the rollers 71 inward until the levers 63 occupy a vertical position as shown in Fig. 14. The grippers 38 are thus caused to engage the fixed grippers 37 to grip and secure the upper and outer corners of the bags.

As shown in Figs. 16 and 17, the forward sides of the spouts 5 (adjacent the gripping devices G) are provided with flexible clips comprising spring members 73 adapted to receive and hold the forward upper edges of the empty bags when the bag mouths are drawn up over the spouts 5, thus making it unnecessary for the operator to hold the forward upper edges of the bags in place when manipulating the handles 65 of the grippers G. Stops 74 and 74', secured to the forward sides of the spouts 5 and the gripping devices G', respectively, serve to position the upper edges of the bags.

As shown in Fig. 12 the faces of the grippers 37 and 38 are bevelled in such manner that they engage along planes passing through the principal axes of the corresponding spouts 5. The angularity of engagement of the grippers 37 and 38, as well as the relative positions of the grippers 37 and 38 with respect to the spouts 5, is important for the reason that variation from the relationship set forth may cause the bags to sag and thus prevent proper handling of the bags, especially at the time the bags are delivered to the conveyor B.

As shown in Figs. 9 and 10, the grippers G which precede the corresponding spouts 5 are rigidly attached to the corresponding vertical shafts 11 by means of set screws 75 while the grippers G' which follow the corresponding spouts 5 are free to turn about the corresponding shafts 11 and are supported from collars 76 keyed to the latter. The grippers G' are provided with inwardly extending arms 77 having holes 78 through which pass adjustable spacing rods 79 pivotally attached at 81 to the corresponding fixed grippers G and having enlarged portions or collars 82 against which the arms 77 are biased by means of springs 83, the outer ends of which are confined by means of adjustable washers 84.

In the position shown in Fig. 10, the springs 83 acting against the arms 77 of the grippers G' and forcing the arms 77 against the collars 82 cause the outer ends of the grippers G and G' to be separated by their maximum distance. During certain portions of the cycle of rotation of the rotary device A, however, the various grippers G', as will be explained hereinbelow, are caused to be biased toward the corresponding grippers G against the action of the springs 83. The bags are attached while the grippers G and G' are thus relatively closely spaced, whereas, after the spouts 5 are withdrawn from the mouths of the bags, the grippers G and G' are caused to be returned to their relatively widely spaced positions as shown in Fig. 10, in order to bring the mouths of the bags held thereby into a taut and closed condition before delivering them to the conveyor B.

Each pair of shafts 11 and the corresponding grippers G and G' are positioned with respect to the corresponding spout 5 by means of the base cam 27, the upper surface of which, as shown in Fig. 8, is provided with an upwardly inclined portion 91, a flat portion of maximum elevation 92, a downwardly inclined portion 93, a level portion 94 of intermediate height, a downwardly sloping portion 95 of minimum height, an upwardly inclined portion 96, and a level portion 97. In the developed view of Fig. 8, the broken lines at either end of the cam 21 correspond to the intersection of the path of travel of the grippers G and G' with respect to the rear end of the conveyor B.

Thus, as soon as the rear gripper G' of each pair corresponding to a single spout 5 passes the line of intersection with the rear end of the conveyor B, and in a manner which will be set forth more clearly hereinbelow, delivers the bag which it holds into the grip of the conveyor B, the corresponding roller 26 engages the inclined surface portion 91 of the cam 27 and rides upwardly onto the level portion 92 of the cam 27, thus elevating the grippers G and G' into the position of the gripper G, shown at the extreme left hand side of Fig. 4. So long as the roller 26 rides along the high level portion 92 of the cam 27 the grippers 37 and 38 of the corresponding gripping devices G and G' occupy positions located several inches above the lower end of the corresponding spout 5.

In the upward motion of the grippers G and G' which occurs as the corresponding cam roller 26 rides up the inclined portion 91 of the base cam 27, a roller 101 (Fig. 3) mounted on the rear pivoted gripper G' engages an inclined surface 102 of a spacing cam 103 which is conveniently mounted by means of a bracket 104 to the upper horizontal plate 14. This engagement of the roller 101 with the cam 103 causes the corresponding gripper G' to be biased toward the spout 5 preceding it, against the action of the corresponding spring 83.

The length of the level portion 92 of the base cam is so proportioned with respect to the rate of rotation of the device A as to allow sufficient time for the upper and outer corners of an empty open-mouthed bag to be inserted in the corresponding gripping devices G and G'.

As soon as the upper and outer corners of the bag have been inserted between the faces of the grippers 37 and 38 of the corresponding devices G and G', the corresponding spout 5 being at this moment inserted in the mouth of the bag, the grippers G and G' are either manually or automatically closed, thus holding and supporting the bag with the upper edges of the bag lying around the sides of the spout 5.

As the rotation of the device A continues, the direction of rotation being counter-clockwise as viewed in Figs. 2 and 5, the roller 26 then passes down the inclined portion 93 of the base cam 27 and, for a time, rides along the upper surface of the level portion 94. As this occurs, the upper edges of the bag are somewhat lowered with respect to their previous positions but still remain above the lower open end of the spout 5, and it is during this travel of the roller 26 along the level portion 94 that the filling of the bag suspended from the corresponding gripping devices G and G' is accomplished. While the filling of the bags may be done manually, it is preferred to provide automatic means for accomplishing the filling of the bags at this point, such means being illustrated in Figs. 9, 18 and 19.

In the preferred instance, in order to increase the capacity of the machine, a plurality of automatic weighing devices 110 and 111 are provided, although any number may be used. In the present instance, these devices 110 and 111 are shown mounted above an angular spout 112 feeding into the hopper 1, and means are provided whereby the device 110 is caused to fill the bags suspended from three alternately spaced hoppers 1, whereas the device 111 is caused to be actuated to fill the bags suspended from the other three spouts 5 located between the spouts 5 filled by the device 110.

Figure 18:
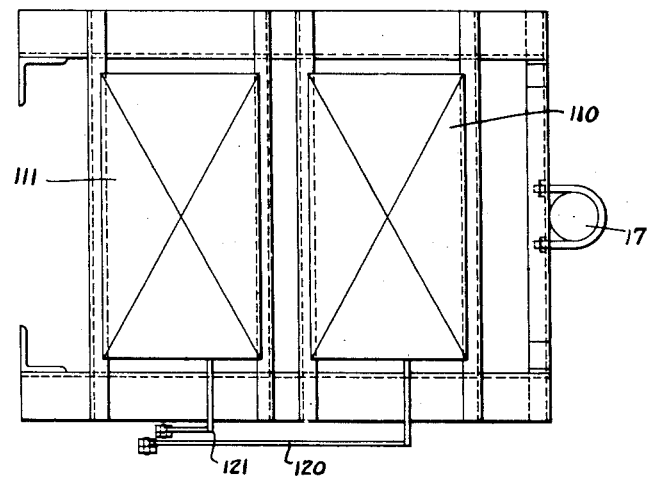
Figs. 18 and 19 are plan and elevational views, respectively, of apparatus adapted to be associated with parts shown in the preceding figures for the purpose of automatically accomplishing the filling of the bags handled by the machine.

Means for accomplishing this alternate and automatic actuation of the devices 110 and 111 are illustrated in Figs. 9, 18 and 19. As shown in Fig. 9, three of the gripping devices G' are provided with arms 115 extending outwards from the operating levers 83 and indicated in full lines in Fig. 9, whereas the other three or alternately located gripping devices G' are provided with arms 116 which are somewhat longer and positioned a little lower than the arms 115 and which arms 116 are indicated by broken lines in Fig. 9.

There are also provided operating levers 117 and 118 which are adapted to be engaged by the arms 115 and 116, respectively, when the corresponding gripping devices G' are in their closed positions, before the cam roller 26 rides off the level portion 92 of the base cam 27.

The operating levers 117 and 118 may be mounted as shown upon a common shaft 119 and through rods 120 and 121 serve to actuate the releasing mechanism of the automatic weighing devices 110 and 111, respectively.

For convenience we may designate the various spouts 5 as #1 to #6. When the spouts #1, #3 and #5 reach the point at which the bags suspended therefrom are to be filled, the arms 115 engage the lever 117, thus actuating the device 110 to deliver a predetermined amount of material through the spout 112, the hopper 1 and the spout 5 into the corresponding bags, whereas, when the spouts #2, #4 and #6 reach the point at which the bags suspended therefrom are to be filled, the arms 116 engage the lever 118 and cause the device 111 to deliver a predetermined quantity of material to each of the corresponding bags in turn.

If any of the gripping devices G' lying to the rear of the spouts 5 are not in an open position, that is to say, when no bag is attached thereto, the corresponding arm 115 or 116, as the case may be, will fail to engage the operating lever 117 or 118 and thus, when the corresponding spout 5 passes the filling station, no material will be delivered from the overhead device 110 or 111. If this were not true, failure of the operator to insert a bag into the machine over any of the spouts 5 as the latter pass through the inserting station corresponding to the level portion 92 of the base cam 27 would subsequently result in a delivery of a large quantity of material through the open spout 5 having no bag suspended therefrom, and this false delivery of material would constitute a serious nuisance and interfere with the advantageous operation of the machine.

As the bags are filled with material delivered from the overhead devices 110 or 111, the increased weight of the bag and its contents requires that means be provided which are located adjacent to the middle or lower portion of the bags for urging the bags forward. Such means comprise pushing plates 125, curved to conform to the shape of the filled bags and mounted from brackets 126 extending outwardly from the lower plate 115. The increased weight of the bags, due to the filling thereof, may also be counterbalanced by means of springs 127, the upper ends of which are attached by means of eye-bolts 128 to the plate 14 and the lower ends of which are attached by means of eye-bolts 129 to the members 25.

After a predetermined quantity of material has been delivered to the bag, it is advantageous to subject the bag to a jogging action in order to settle the contents of the bag, it having been found that this jogging and settling action considerably decreases the length of the empty bag and thereby results in a considerable saving of paper or other bag material. In the present instance, this is accomplished by means of an arcuate vibrating roller-conveyor device H surrounding the lower portion of the rotary device A, the details of which are illustrated in Figs. 5, 6 and 7.

The device H comprises a frame 130 carrying a plurality of radially disposed rollers 131. The frame 130 is pivotally supported at each end upon adjustable jacks 132 having horizontal pins 133 passing through angles 134 forming parts of the frame 130. The central portion of the frame 130 ordinarily rests upon a pair of adjustable jacks 136 but is provided with a cam roller 137 adapted to be engaged by the cam 138 keyed to a shaft 139 mounted in bearings 140 attached to the jacks 136. The shaft 139 also carries a sprocket at 142 adapted to be driven by a chain 143 from a suitable motor (not shown).

As the shaft 139 rotates, the cam 138 periodically engages the cam roller 137 and raises the central portion of the frame 130 carrying the roller 131. It will be observed that the motion thus imparted to the roller 131 is greatest immediately above the cam 138 and diminishes to zero or practically zero at the ends of the arcuate conveyor H.

After some, for example sixty pounds of a hundred pound charge, of the material has entered the bag, the sides of the bag bulge and cause the bottom of the bag to rise; consequently, at this time, the cam roller 26 rides down the incline 93 onto the level portion 94 of the base cam 27, thus lowering the bag bottom onto the jogging conveyor H, where it is vibrated during the remaining portion of the filling time.

It will be understood that the precise location of the incline 93 will be governed by the effect of the material upon the shape of the bag, and that while, in the present instance, the incline 93 is located at a point shortly after a little over half of the total amount to be discharged into the bag has actually entered the bag, in other instances, the incline 93 may be otherwise located, in accordance with the behavior of the bags on filling.

After the bag has been filled, the roller 26 corresponding to the gripping devices G and G' from which the bag is suspended traverses the portion 95 of the base cam 27 thus lowering the corresponding gripping devices G and G' until the upper edges of the bag are lowered below the extreme lower end of the corresponding spout 5. The bag is lowered onto the arcuate roller conveyor H and the jogging action of the latter causes the contents of the bag to settle. The filled and settled bag then approaches the rear end of the conveyor B and is ready for delivery to the latter.

It may be remarked at this point, that the lowering of the bag as the cam roller 26 traverses the portion 95 of the base cam 27 also causes the roller 101 on the corresponding gripping device G' to ride downward along the edge of the stationary cam 103, thus placing the bag mouth under the tensional force exerted by the corresponding spring 83 so that as soon as the mouth of the bag falls below the bottom of the corresponding spout 5, the mouth of the bag is drawn taut in a closed position ready for delivery into the grip of the conveyor device B.

Although the heretofore described gripping means is a satisfactory mechanism for accomplishing the desired results, an alternate form whereby the gripping means are pivoted about radial axes to allow spreading of the bag mouth is found to be more satisfactory under some conditions. Such a device is illustrated in Figs. 45 to 48 inclusive. In Fig. 45 a portion of the turret and one of the grippers is shown in section and elevation, the view being similar to Fig. 9. Mounted upon the support 14 is a member 144 having two arms each of which support a pair of rollers 145 between which are guided the rods 11. Similar rollers 146 are mounted on arms of a lower member 147 supported on the plate 15. Rods 11 are joined at their bottoms by the member 25 carrying roller 26 which rides upon the cam 27 as explained in connection with Fig. 4. The spring 127 connects member 25 to the central portion of member 144 and tends to support the weight of the bag.

The grippers in the present modification comprise opposite similar grippers mounted adjacent the filling spout 5. The mounting for each gripper comprises an elbow 148 clamped to rod 11 and carrying a rod 149 extending radially outward. A member 153 mounted at the end of rod 149 supports the actual gripping jaws. By adjustment of member 153 longitudinally of rod 149 the gripper may be shifted radially in order to adjust its position relative to the filling spout. Member 148 may also be adjustably turned about rod 11 so as to vary the position of the gripper with respect to the end edges of the filling spout. Member 153 supports on its lower side a member 154 having a bore through which a pivot pin 155 extends. Supported on the ends of the pivot 155 is the fixed jaw 156 of the gripper. A portion of the jaw 156 is formed into a yoke 157, the fingers of which straddle the forwardly extending end of member 153. Bolts set into the fingers of yoke 157 may be so adjusted as to limit the extent to which the jaws of the gripper may pivot about pivot pin 155. The movable jaw of the gripper is supported on the fixed jaw 156 and hence the entire gripper jaws and the mechanism to open and close the jaws swing about pivot 155. The movable jaw is operated through a linkage mounted on the fixed jaw and duplicated on each side thereof so that description of the linkage on one side alone is sufficient. The operating arm 162 extends forwardly and is pivoted at 163. The rearward portion of the arm is pivoted to a link 164 which connects the arm to the joint of a toggle. One link 165 of the toggle is pivoted to the fixed jaw, the other link 166 is pivoted to the joint of a second toggle. One link 167 of this second toggle is pivoted to the fixed jaw and the other link 168 comprises an extension of the movable gripper jaw. The movable jaw is supported and positioned in its movement by a connecting link 169 fastened to both jaws of the gripper. In Fig. 45 the jaws are opened while in Fig. 46 it is seen that when arm 162 is raised the toggle 165, 166 is straightened, this action straightening the second toggle to close the jaws, and due to the toggle relationship the jaws positively grip the mouth of the bag which is placed therebetween. The fixed jaw 156 carries a clamping plate 170 mounted on a spring-pressed plunger which is limited in its movement toward the movable jaw but may be pushed inward to compensate for various thicknesses of bags. The spring is sufficiently strong to insure positive gripping action. The movable jaw 168 carries a clamping plate 171 which may be adjusted relative to the fixed jaw so that the outer side of the bag will be properly located with respect to the portions of the machine which subsequently grip the bag.

The gripping members are maintained inclined toward each other when the bag mouth is over the filling spout to allow the bag mouth to be spread as it is filled and lowered onto the jogging mechanism. To allow this the arms 172 and 173 of a toggle are connected to the grippers G, G' (Fig. 48). The toggle arms are in alignment when the grippers are vertically positioned and the toggle is broken to allow the bag mouth to spread. Knuckles 174 at the joint of the toggle prevent the arms from passing above the horizontal and the toggle must be broken downward. To accomplish this the following mechanism is used: An intermediate arm 175 of the support 144 extends outward and carries a vertical rod 177 which extends downward between the gripper supports. At its lower end rod 177 carries an arm or abutment 178 which guides a vertical rod 176 pivoted to the joint of the toggle 172, 173. Rod 176 carries an adjustable abutment 179 at its upper end and a coil spring 180 encircles the rod and rests upon the abutment 178. The spring 180 does not extend the full distance between the two abutments when the grippers are in their elevated position to receive an empty bag. However, as rollers 26 drop down the incline 93 to allow the bag to settle upon the jogging mechanism, the abutment 178 will approach abutment 179. Continued lowering of the roller onto portion 95 of cam 27 will bring the spring into compression and the spring will thereby resiliently align the arms of the toggle upward, the upward movement being limited by stops 174. By straightening the toggle it is obvious that the gripper jaws are pivoted about their respective pivots and will thereby draw the mouth of the bag tight. The roller may ride upon the portion 95 and the portion 97 and cam 27 without allowing the toggle to break since the spring 180 may be compressed by movement of the abutment 179 without thereby affecting the toggle. However, as roller 26 travels upward along portion 91 of the cam the abutment 179 is lifted clear of spring 180. The weight of the toggle arms will cause the toggle to be broken and the grippers may swing inwardly in a position to receive the next empty bag which will be inserted about the spout 5.

The operating handle of the grippers is supplied with the roller 161 as described in connection with Fig. 9. Cams 69 and 71 are so positioned in the path of roller 161 as to positively open and close the grippers as they rotate about the central shaft.

The strength and length of spring 180 is such that sufficient thrust is placed upon the toggle to straighten its arms, but as may be appreciated, it may be and is so proportioned that a greater thrust upon either of the gripper members than is usually applied as the bag is being jogged, will cause the toggle to break against the compression of spring 180. For this reason the arms of the toggle are never allowed to become completely aligned, so that a direct pull upon either corner of the bag may slightly break the toggle. This is in order to allow swinging of the rear set of grippers after the forward set of grippers has been released by cam 69 and the forward edge of the bag has been gripped in the secondary conveyor which is traveling faster than the speed of the turret, as will be subsequently described. In this fashion it is seen that means are provided to bring the grippers together as they are raised and to resiliently spread them as they are lowered, and that the rear gripper may swing toward the forward gripper after the forward edge of the bag has passed into the second conveyor. Thus this form of gripping mechanism functions in the identical manner that the previously described form functions.

The form of the bag filling device in relation to the scale tripping mechanism illustrated in Figs. 18 and 19 discloses means whereby the scales are tripped when the movable jaw is clamped to the fixed jaw. This provides means whereby the scale buckets are controlled by the positioning of the movable jaw and it might so happen that the scale bucket will be tripped when no bag has been clamped to the spout. The following mechanism, illustrated in Figs. 49 to 52 inclusive, comprises means operated by the presence of the bag itself for tripping the scale bucket and therefore assures that no charge will be dumped when a bag has not been placed upon the machine. This mechanism is so related to the turret that the scales 110 and 111 will be alternately tripped, this sequence of action not being disturbed if a bag should not be placed on one of the spouts. Hence, it is positively assured that a scale bucket will have time to be refilled and also positively assured that a charge will not be dumped when a bag is not present.

This mechanism comprises a feeler 181 located below the end of the filling spout 5 and biased into operative position by a spring 182 fixed to the frame of the machine and to a pin extending outward from a vertical rod 183 which carries the feeler 181. Rod 183 is supported in vertical bearings fixed to the frame of the machine and prevented from vertical displacement by a thrust bearing 184. A pair of spaced fingers 185 and 186 fixed to rod 183 straddle one of the bearing supports and prevent feeler 181 from swinging more than a limited distance. The bag is inflexible to an extent sufficient to rock feeler 181 against the tension of spring 182 and hence will force finger 185 against the bearing support whenever a bag is present, while the spring 182 will force finger 186 against the bearing support whenever a bag is absent. Fixed to the upper end of rod 184 is a supporting arm 187 which restrains an arm 188 pivoted to the extreme end of rod 183 from passing below a horizontal position. Arm 188 carries an enlarged head 189 which obviously swings inward or outward in accordance with the movement of feeler 181. A bell crank having a vertical arm 190 and a relatively horizontal arm 191 is pivoted to an extension of the frame in such a manner that arm 190 is normally maintained vertically, and arm 191 is normally maintained in a horizontal plane below the lower end of head 189. A series of members 192 are fixed to the rim of the turret, being mounted so that they may be adjusted relative to the center line of the filling spouts 5. As the turret rotates each of the members 192 strikes arm 190 of the bell crank and rocks the horizontal arm 191 upward until member 192 passes beneath the end of the bell crank. If a bag is in position on the filling spout, feeler 181 will cause the head 189 to be positioned above the bell crank and the member 192 will rock arm 188 upward about its pivot. However, if there is no bag present the head 189 will be maintained out of operative position and the rocking of a bell crank will have no effect. A vertical rod 193 is supported for sliding movement in a bearing directly over the horizontal arm 191 of the bell crank and is so positioned that the head 189 may be interposed between the horizontal arm of the bell crank and the lower end of the rod. Rod 193 is pivoted to an arm 194 loosely mounted on a shaft 195 extending alongside of the scales and is fixed to an arm 196 also loosely mounted on the shaft 195. Arm 196 carries a pawl 197 which cooperates with the teeth of a ratchet 198 fixed to shaft 195 and having preferably six teeth, although any greater even number of teeth will suffice. It is seen from the foregoing that whenever the feeler 181 cooperates with a bag to swing head 189 into the path of the bell crank 191 that shaft 195 will be rotated a sixth of one complete revolution. Fixed to shaft 195 are two ratchets 199 and 199', each having a number of teeth equal to half of the number of teeth on the ratchet 198, in this instance each ratchet being provided with three teeth. The teeth on ratchet 199 are in alignment with the even numbered teeth on ratchet 198, while the teeth on ratchet 199' are in alignment with the odd numbered teeth on the ratchet 198. The trips operating the scale buckets are associated with the ratchets 199 and 199' and it is obvious that each scale bucket will be operated once for every third of a revolution of shaft 195, and that the scale bucket 110 will be operated upon the first upward reciprocation of rod 193 to rotate shaft 195 a sixth of a revolution from its position in Fig. 51. During this time the trip of scale bucket 111 is merely riding up on a tooth of ratchet 199 and will not operate scale bucket 111 until the succeeding upward reciprocation of rod 193. In this fashion it is assured that the bell crank 191 may be rocked any number of times but will not affect the scale buckets until a bag has been properly positioned and that as a result the operation of the scales will always be in an alternating manner. In Fig. 50 it is seen that member 192 contacts the bell crank at the time that the leading edge of the compartment 2 passes the forward edge of the chute 112 and as previously explained the charge will be dumped before the trailing edge of compartment 2 passes the chute. Member 192 is adjustably mounted so as to accurately time the tripping of the scale with relation to the passage of the compartment beneath the scale.

The conveyor device B, as will be set forth more clearly hereinbelow, comprises in part a pair of endless chains or V-belts 150 which pass over a pair of opposed rollers 151 and 152 located at the extreme rear end of the conveyor B. As will be apparent from inspection of Fig. 4, the belts 150 are adapted to engage and grip the bags a little below the grippers 37 and 38 of the gripping devices G and G'.

The center of the rotary device A is so located with respect to the intersection of the belts 150 between the rollers 151 and 152 that the forward ends of the bags suspended from the gripping devices G are introduced exactly into the point of intersection of the belts 150 passing around the rollers 151 and 152. Likewise, the rear ends of the bag mouths held between the jaws of the grippers 37 and 38 of the gripping device G' are conveyed exactly into the line of intersection of the belts 150.

We have found that, although the center line of the rotary device A may be located in a line drawn through the axes of rotation of the rollers 151 and 152, it is advantageous to locate the center of the rotary device A slightly to the rear of this imaginary line in order to reduce the maximum angularity of the bag mouths with respect to the line of intersection of the belts 150.

By thus locating the center of the rotary device A to the rear of the intersection of the belts 150, it will be apparent especially from inspection of Fig. 2, that as the front end of a bag mouth enters the grip of the belts 150 the rear end of the bag will pass from a point of maximum angularity on one side of an imaginary line forming an extension of the line of intersection of the belts 150 to a point of angularity lying on the other side of this imaginary line. Thus, the preferred location of the center of the rotary device A reduces the maximum angularity of the bag mouth with respect to the line of intersection of the belts 150 in comparison to the least angle which would obtain if the center of the rotary device A were located in a plane intersecting the centers of the pulleys 151 and 152.

Figure 2A:
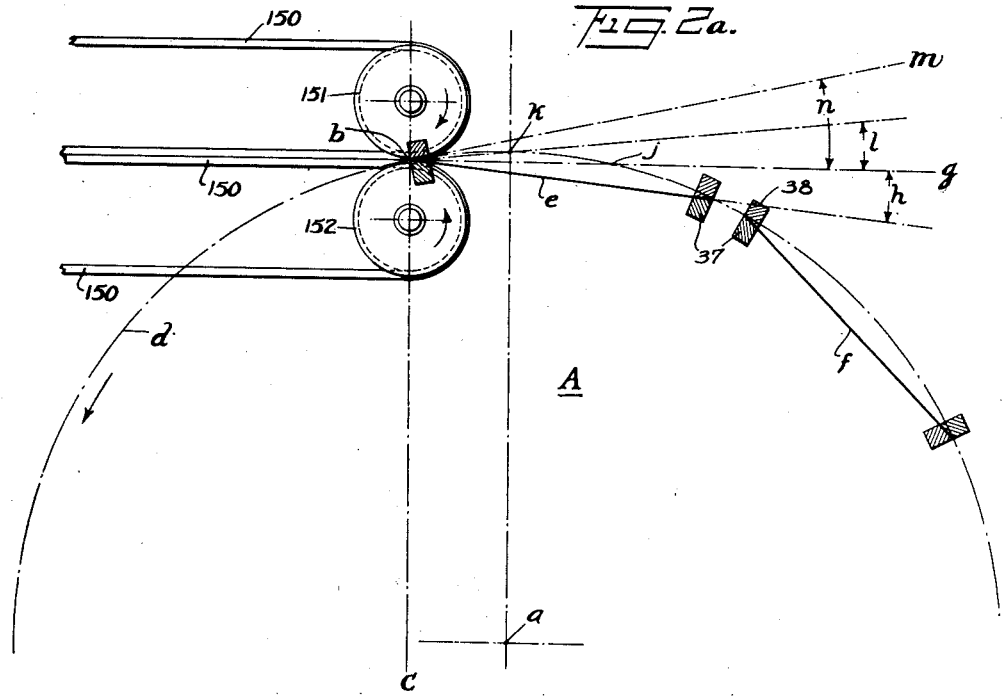
Figs. 2A and 2B are diagrams, in plan, illustrating two different relations of the various parts illustrated in Fig. 2 and elsewhere.

By means of actual experience, we have found that the relation of the center of the turret device A with respect to the belts or chains 150 is of the utmost importance, in order to insure the feeding of the bag mouths into the conveyor B in proper condition. In Fig. 2A, we have illustrated the preferred relation more or less diagrammatically.

In Fig. 2A, the point $a$ represents the center of rotation of the turret device A, while the point $b$ is the entrance into the conveyor B, that is to say, the point of incipient parallelism of the belts 150. The point $b$ lies on a straight line $b\ c$ passing through the centers of rotation of the pulleys 151 and 152 which carry the belts 150.

It will, of course, be obvious that the circle $d$, which represents the path of the intersections of the grippers 37 and 38, must pass through the point $b$. In the figure, $e$ and $f$ represent two bags carried by the turret A, the structural details of which are omitted for the sake of clarity. The bag $e$ is shown just as the forward edge of the bag mouth reaches the point $b$, the angle between the bag mouth and the line $b\ g$ (which is an extension of the line of intersection of the belts 150) being designated as $h$.

The preferred relation of the point $a$ is approximately one-third of the length of the bag mouth to the rear of the line $b\ c$. We have found that, irrespective to a remarkable extent of the size of the bags and the number and spacing of the bags on the turret A, this location gives the most satisfactory results.

Thus, in the case of a nine-bag turret, with 18 inch bags spaced two inches apart, the angle $h$ is approximately 6°0' with the relation indicated above.

As the bag $e$ advances into the conveyor B, the rear end of the bag mouth follows the circle $d$. At the point $j$, the rear end of the bag crosses the line $b\ g$, the bag at this moment being precisely aligned with the intersecting portions of the belts 150, and the angle $h$ being reduced to zero. At this moment, one-third of the bag mouth has entered the grip of the belts 150.

As the bag $e$ advances further, the rear end of the bag mouth crosses the line $a\ k$, which is drawn parallel to the line $b\ c$ at a distance therefrom equal to one-third of the length of the bag mouth (that is to say, the width of the bag when flat and empty).

The angularity at this point is represented by the character of reference $l$, and is approximately, or exactly, equal to the initial angularity $h$. At this point, two-thirds of the bag mouth has entered the grip of the belts 150.

As the remainder of the bag mouth enters the grip of the conveyor belts 150, it will be apparent that the ever-diminishing portion of the bag mouth lying outside the grip of the belts 150 tends to approach the line $b\,m$, which is tangent to the circle $d$ at the point $b$. While the angle $n$ between the lines $b\,g$ and $b\,m$ may appear to be considerably greater than the initial angle $h$, we have found that, in practice, either this angle is only reached by a very small part of the bag mouth or the curvature of the pulley 151 prevents any portion of the bag from ever reaching this angularity, but at any rate, its effect is negligible compared with the angularity of the bag mouth with respect to the conveyor B during the first two-thirds or even more of the period in which the bag mouth is being fed into the grip of the belts 150.

We therefore prefer to so locate the center of rotation of the turret A with respect to the conveyor B that the total angularity of the bag mouth during that part of the entering time in which the major portion, preferably two-thirds, of the bag mouth still lies outside the grip of the conveyor belts 150 is bisected, or substantially bisected, by the line $b\,g$ forming an extension of the line of movement of the bag mouths while in the grip of the belts 150. As stated hereinabove, the preferred condition, within practical limits, is obtained when the center of the turret A is located a distance equal to one-third of the length of the mouths of bags handled to the rear of the rear end of the intersecting or gripping line of the belts 150.

Figure 2B:
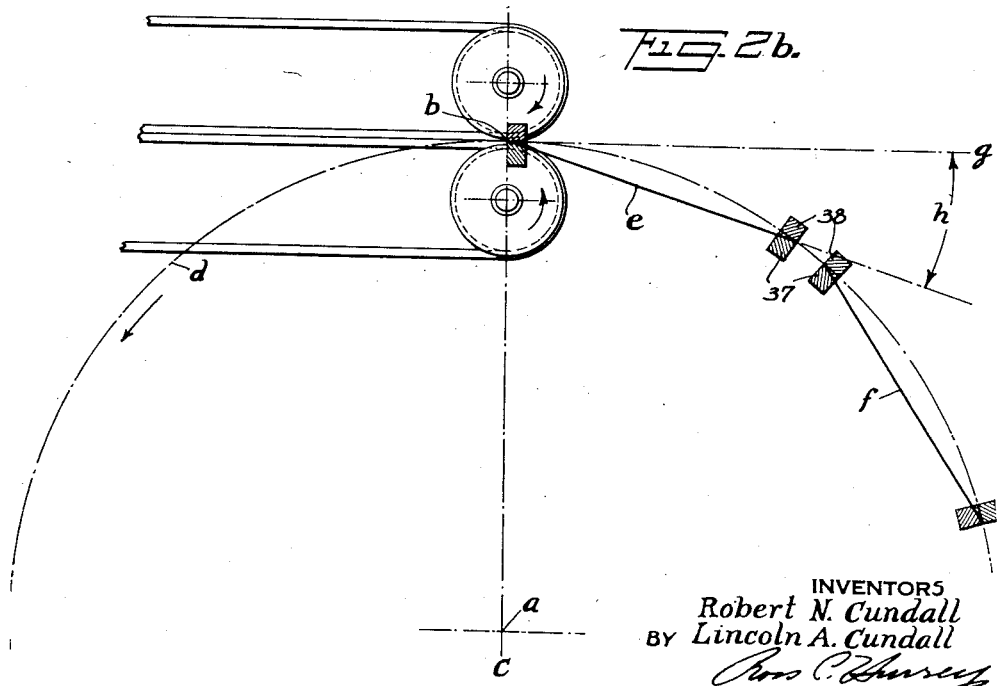

By comparing Fig. 2A with Fig. 2B, which is a similar view illustrating the conditions which obtain when the center of rotation of the turret device A is located on a line drawn through the centers of rotation of the pulleys 151 and 152, the advantages of the preferred relation may be more fully comprehended. However, the relation illustrated in Fig. 2B may be employed, if desired. In this instance, the maximum angularity occurs over that portion of the time when the greater portion of the bag mouth has yet to enter the grip of the belts 150, and may be as high as 24° or more under practical conditions of turret and bag size.

At the moments when the various gripping devices G and G' intersect an imaginary line drawn between the centers of the pulleys 151 and 152, the corresponding movable grippers 38 must be separated from the fixed grippers 37 in order to release the bags from the gripping devices G and G', the bags then being transferred to the grip of the belts 150. Means for automatically accomplishing this are provided in cam rollers 161 mounted on the operating levers 63 of the gripping devices G and G'. The rollers 161 are so positioned as to engage a fixed cam 162 mounted upon a supporting bracket 163 attached to the frame of the conveyor A. The cam 162 engages the rollers 161 when the corresponding gripping devices G or G' traverse the point of intersection of the belts 150, or almost immediately thereafter, sufficient time being allowed merely for the bags to enter the grip of the belt 150 before being released from the gripping devices G or G' as the case may be.

Each pair of gripping devices G and G' then passes around in a counterclockwise direction until free of the frame of the conveyor B, the corresponding roller 26 riding upward along the inclined surface 91 of the base cam 27 until it reaches the upper level portion 92 of the cam 27. The bags are then attached in the manner described hereinabove and a new cycle of operations is inaugurated.

The main conveyor B

The main conveyor B, the sewing machine C, the tape-applying mechanism D, the tape-squeezing mechanism E, and the shear F are mounted on a frame which in the present instance comprises main horizontal angle members 200 and 201, vertical supports 202 and lateral supporting members 203.

The main conveyor device B comprises in part the endless chains or belts 150 passing over the opposed pulleys 151 and 152 and a similar pair of opposed pulleys 213 and 214. The latter are keyed to or made integral with a pair of pulleys 215 and 216 located just below the pulleys 213 and 214, respectively, and adapted to receive endless V-belts 217, the forward ends of which pass around a pair of opposed driven pulleys 218 and 219.

In order to cause the belts 150 and 217 to grip the mouths of the bags, the pulleys 152, 214 and 216, and 219 are mounted on vertical shafts set in brackets 222 rigidly mounted on the main angle 201, while the pulleys 151, 213, 215 and 218 are mounted on vertical shafts set in brackets 223 lying on the angle 200 opposite the brackets 222 between guide members 224 and 225 and biased by means of tension springs 226 toward the brackets 222. The springs 226 are attached at their opposite ends to adjustable pins 227 set in lugs 228 forming parts of the brackets 223, and to pins 230 fastened to the angle 200 and extending upwardly through slots 231 in the brackets 223.

In order to maintain the opposed portions of the belts 150 and 217 lying between the various belt pulleys under a strong but yielding compressive force, we provide a plurality of pulleys 235 mounted on vertical shafts 236 carried in yoke members 237 attached by means of fasteners 238 to brackets 239 mounted on the angle 201. Located opposite to each one of the fixed rollers or pulleys 235 is a pulley 240 mounted on a vertical shaft 241 journalled in a yoke frame 242 pivotally mounted on a vertical shaft 243 rigidly clamped by means of a set screw 244 to a bracket 245 fastened to the angle 200. Each of the shafts 243 carries a block 246 to which is fastened a leaf spring 247, the outer end of which engages the corresponding shaft 241 and biases the corresponding pulley 240 toward the pulley 235 which opposes it, thus forcing together the belts 150 or 217, as the case may be, to grip the mouth of the bag as shown in Fig. 21.

The rollers or pulleys 235 and 240 are provided at frequent intervals between the main pulleys, wherever the positions of the remaining apparatus permits, the spacing in any event being sufficiently close to maintain the entire lengths of the adjacent portions of the belts 150 and 217 under sufficient compression to prevent their grip on the mouths of the bags from relaxing.

The main conveyor B also comprises a flat endless belt 250, the upper part of which is supported on a plurality of rollers 251 journalled in horizontal angle members 252 which are supported by means of adjustable screws 253 from the lateral frame members 203. One end of the belt 250 passes over a pulley 255 mounted on a horizontal shaft 256 at the forward end of the machine, while the rear end of the belt 250 passes over a pulley 257 mounted on a shaft 258 journalled in bearings 263 attached to the lateral supporting members 203, and under an idler pulley 264 mounted on supports 265 attached to the angles 252.

The screws 253 are adjusted to such height that the upper part of the belt 250 lying above the rollers 251 supports the bottoms of the bags, the mouths of which are gripped by the belts 150 and 217. The linear rates of travel of the belts 150, 217 and 250 are identical; the rate of travel of the belts 150 is equal, or preferably slightly greater than the peripheral speed of the grippers 37 and 38, in order to maintain the bag mouths taut as they are fed into the conveyor B.

*The driving mechanism*

A motor (not shown), through a belt 280 and a pulley 281, drives a high-speed shaft 282. A second high-speed shaft 283 is driven by the shaft 282 through a sprocket chain 284. The shaft 282, through a reducing gear 285, also drives a low-speed shaft 286, which is connected by means of a sprocket chain 287 to a shaft 288 journalled in bearings 289 mounted on two of the vertical supporting members 202. The shaft 288 through a sprocket chain 290 also drives a shaft 291 carried in bearings 292 and connected at one end by means of gearing 293 to a cam shaft 294 extending lengthwise of the machine.

The shaft 288 through a sprocket chain 295 also drives the shaft 256 which carries the belt pulley 255 and which is journalled in bearings 296. The shaft 256 also carries a sprocket 297 that is connected by means of a sprocket chain 298 to a sprocket 299 keyed to the shaft 23 which drives the rotary feeding device A.

Also keyed to the shaft 256 is a sprocket 301 which, through a chain 302, drives a sprocket 303 and a shaft 304 to which the sprocket 303 is keyed. The shaft 304 is journalled in bearings 305 mounted on uprights 306 and carries bevel gears 307 adapted to mesh with bevel gears 308 and 309 keyed to vertical shafts 310 and 311 journalled in bearings 312 and 313. Through sprocket chains 315 and 316 the shafts 310 and 311 drive the end pulleys 218 and 219, respectively, which carry the belts 217.

*The sewing machine*

After the bags have been filled and delivered by the rotary device A to the conveyor B, the bags move forward resting upon the belt 250, the mouths of the bags being tightly gripped between the belts 150. The bags soon reach the forward end of the belts 150 and the belts 217 then grip the mouths of the bags a little below the upper edges thereof. Shortly after the mouths of the bags come into the grip of the belts 217, the bags pass through the sewing station C.

As each bag moves forward past the sewing station C, the mouth of the bag is sewed by a sewing machine or sewing head 350, preferably of the type set forth in the Letters Patent of the United States #1,963,652, granted to Robert N. Cundall on June 19, 1934, and pivotally mounted upon a supporting bracket 351 as set forth in the copending application of Robert N. Cundall, Serial No. 640,758, filed November 2, 1932, and the aforesaid copending application of Robert N. Cundall and Lincoln A. Cundall, Serial No. 666,114, filed April 14, 1933.

This pivoted mounting permits the bags to move continuously and uninterruptedly through the sewing station, the throat portion 352 of the sewing head 350 moving forward with the bag as each stitch is made and then returning to position for the next stitch.

The sewing head 350 is provided with a supporting arm 353, the upper and outer end of which is fastened to one end of a horizontal cantilever shaft 354 journalled in a sleeve 355 forming a part of the bracket 351, which is attached to the angle 200. The shaft 354 is in axial alignment with the drive shaft 356 of the sewing head 350, which is preferably located as closely in line with a central axis of gravity of the sewing head 350 as possible.

Additional lateral support for the sewing head 350 is provided in a roller 357, mounted on bracket members 358 and 359 attached to the bracket 351, and bearing laterally against lower and outer edge 360 of the arm 353. The arm 353 also carries an extension 361 having a set screw 362 adapted to bear against the member 358 when the sewing head 350 is in a vertical position, and an extension 363 having a set screw 364 adapted to engage the opposite side of the member 358 to limit the forward travel of the lower part of the sewing head 350. A spring 365 is provided for biasing the sewing head 350 toward a vertical position.

The drive shaft 356 of the sewing head 350 carries a spur gear 380 adapted to mesh with a gear 381 mounted on a shaft 382 journalled in a lug 383 forming a part of the bracket 351. The shaft 382 also carries a bevel gear 384 which meshes with another bevel gear 385 mounted on the high speed shaft 283 and driven by the shaft 283 through a clutch 387 (Fig. 2). The shaft 283 is journalled in a bearing 388 forming a part of the bracket 351.

Freely mounted on the end of the shaft 283 and held at a fixed distance from the bracket 351 by a head 391 on the end of the shaft 283 is a bell-crank 392, carrying a beveled pin 393, and the outer end of one arm of which is connected by a rod 394 to a lever 395. Also freely mounted upon the shaft 283 is a lever 396 carrying a beveled pin 397 adapted to engage the pin 393, and the end of which is connected by a rod 398 to the angle 200. The operating lever 395 is pivotally attached at 399 to one of the upright frame members 202 and extends laterally across the machine past the opposite member 202. The free end 400 of the lever 395 is connected by means of a spring 401 to one of the lateral frame members 203, but may be depressed by the foot of the operator, against the action of the spring 401, into the position shown in dotted lines in Fig. 24, where it is held by a latch member 402.

When the lever 395 is in the position in which it is shown in full lines in Fig. 24, the pins 393 and 397, the bell-crank 392 and the lever 396 occupy the relative positions in which they are shown in Figs. 24, 26 and 27, and the sewing head 350 is idle.

When the first of a series of bags, after being filled in the turret A, is delivered by the latter to the conveyor B and approaches the sewing station C, the operator depresses the end 400 of the lever 395 and locks it below the latch 402.

The resultant movement of the crank 392 causes the pins 393 and 397 to engage, forcing the lever 396 toward the gear 385 and engaging the clutch 387, thus causing the gear 385 to rotate with the shaft 283 and driving the sewing machine 350.

It will be understood that the sewing machine 350 operates continuously thereafter, and that the series of bags passing therethrough are caused to be joined by a chain of stitching.

In the preferred instance, the sewing machine 350 is adapted to form a so-called "cushion-stitch" or "snake-stitch", as set forth in the Letters Patent of the United States #1,913,825, granted to Webster Noyes Baker on June 13, 1933. In the formation of the "snake-stitch", relatively heavy cords are wound in and out on each side of a conventional chain stitch, the cord thus serving to protect the paper from being torn by the relatively light thread or string with which the chain stitch is formed. In the present instance, thread for the chain-stitching and cord for the "snake-stitching" are drawn by the machine 350 from spools 405 and 406, respectively, which are supported upon a stand 407 attached to the bracket 351.

While the foregoing presents one form of sewing mechanism whereby the sewing head is allowed to oscillate in the direction of bag travel, a second form is illustrated in Figs. 53 and 54. In this mechanism the oscillation is positively insured in a sewing machine of which the operation, mounting and arrangement are otherwise identical.

This form comprises mechanical oscillating means including a bevel gear 410 loose on shaft 283 and in mesh with gear 384. Attached to gear 410 is a sprocket 411 driving a sprocket 412 through a chain 413. Sprocket 412 is mounted on a short shaft carried in arms of a standard 414 fixed to a shelf 415 attached to bracket 351. A cam member 416 fixed to sprocket 412 has an inclined annular cam groove cut therein. Arms 417 and 418 comprise an elbow linkage, arm 417 being pivoted to standard 414 and arm 418 pivoted to the sewing head supporting arm 353. At the joint of the linkage is a roller which rides in the groove of member 416.

It is obvious from the foregoing description that the member 416 is continuously rotated at all times when the sewing machine is operating, making one revolution for each stitching cycle. As member 416 rotates, arm 418 and supporting arm 353 cause the sewing head to oscillate through a vertical plane in time with the advance and retraction of the sewing needle as previously described. This positive mechanical oscillation of the head not only insures the formation of regular stitches, but decreases damaging stresses on the needle and other parts.

The mouths of the bags having been sewed, the bags move forward to the tape-applying station D.

*Tape-applying mechanism*

As the bags progress forward along the conveyor B, the mouths of the bags in the grip of the belts 217 encounter a tape-applying mechanism which comprises principally a pair of driven rollers 450 and 450' located opposite each other at a point just below the upper edges of the bags.

The roller 450 is keyed to a short vertical shaft 451 journalled in a lug 452 having a side extension 453 rigidly fastened by means of suitable fastening devices 455 to the front face 457 of a supporting bridge 458, and carrying a spur gear 460. The roller 450' is keyed to a vertical shaft 451' journalled in a lug 452' having a side extension 453' provided with slots 454' and slidably held against the front face 457 of the bridge 458 by means of fasteners 455' extending through the slots 454'.

As will be observed from inspection of Fig. 32, the face 457 of the bridge support 458 is provided with a groove 461 adapted to receive and guide the extension 453'. At one outer end of the groove 461 there is provided a lug 462 carrying an adjustable member 463. A compression spring 464 is located between the outer end of the extension 453' and the member 463 and serves to force the lug 452' toward the lug 452. The rollers 450 and 450' may, however, be prevented from actually meeting under the influence of the spring 464 by means of an adjustable stop comprising a set screw 465.

The shaft 451' carries a spur gear 460' which meshes with the gear 460 and the shaft 451 carries a sprocket 466 driven by a chain 467, as will be explained hereinbelow, at such speed that the peripheral speed of the rollers 450 and 450' corresponds to the linear speed of the belts 217 and 250.

Tape is applied to the mouths of the bags approaching the rollers 450 and 450' by means of a tapered guide 470, the forward end of which is located immediately behind the rollers 450 and 450' and is relatively narrow and deep as shown in Fig. 33, whereas the rear end of the guide 470 is relatively shallow and wide as shown in Fig. 34. The guide 470 serves to receive flat tape from a roller 471 and to fold the sides of the tape over the sewed mouths of the bags just prior to the point at which the mouths of the bags pass between the rollers 450 and 450'.

The forward end of the guide 470 is conveniently supported by means of a threaded supporting member 472 carrying an adjusting nut 473 and passing through slots 474 in the rear of the bridge support 458. A compression spring 475 is also provided to assist in maintaining the guide 470 in position. The rear end of the guide 470 is suitably supported by means of a threaded member 476, a nut 477 and a spring 478 from a supporting arm 479 extending laterally from a collar 480 mounted on a vertical supporting rod 481.

The tape web 483 passes from a roll 482 supported by the rod 481 around a roller 484 and over a glue-applying roller 485, a portion of which is immersed in a bath 486 of glue or other adhesive material carried in a trough 487 mounted upon a standard 488. The web 483 then passes under a roller 489, its under surface having been coated with adhesive material transferred to it from the bath 486 by the roller 485.

The roller 485 may be provided, as shown in Fig. 32, with a scraper 491 adjustably mounted by means of a screw 492 and a spring 493 above the trough 487 in such manner as to control the amount of glue or other adhesive which adheres to the roll 485 and is transferred in part to the tape web 483.

A scraper 494, the upper edge of which is close to the roller 489, removes excess glue from the tape 483. The latter is then partially dried as it passes to and over a roller 495 (Fig. 1) conveniently supported by the members 306 and returns over a roller 496 mounted upon standards 497 attached to the bridge support 458 to the roller 471. From the roller 471 the tape passes into the guide 470.

In this manner the glue with which one face of the tape is coated is allowed sufficient time to partially set and dry before the tape is applied to the mouths of the bags, which makes it possible to remove the bags from the machine in a dry condition very shortly after the tape has been applied to the bag mouths.

Due to the considerable length of the web between the rollers 471 and 485, it is desirable to drive the latter at a peripheral speed equal to the rate of speed at which the bags are progressed by the belts 217. In the present instance, this is accomplished by means of an endless belt 498 driven from a pulley 499 keyed to a shaft 500, which shaft is in turn driven through gearing 502 (Fig. 1) by the shaft 294. The belt 498 passes over pulleys 503 and over a pulley 504 keyed to a shaft 505 on which is mounted the glue roller 485.

It will be observed that the outer surface of the rollers 450 and 450' are knurled or otherwise roughened. The distance between the rollers 450 and 450' is such that when the forward end of a bag passes through the guide 470 and passes between the rollers 450 and 450', the combined action of the moving bag and the rotating rollers 450 and 450' draws tape into and through the guide 470 at the rate at which the bags progress, thus taping the mouths of the bags.

The construction is such, as will be obvious from the above, that the rollers 450 and 450' exert a yielding but firm pressure upon the outer sides of the tape surrounding the mouth of the bag, thus applying the tape to the bag mouth in an efficient manner.

Where a so-called "snake-stitch" or other reinforcing for the stitching of the bag mouths is made by the sewing machine 350, or otherwise, the rollers 450 and 450' may be provided as shown with grooves 510 and 510', respectively, so located as to accommodate the stitching and reinforcement which has been applied to the mouth of the bags and to prevent the pressure of the rollers 450 and 450' from injuring the same.

*Tape-squeezing mechanism*

In order to insure firm adhesion of the tape to the sewed mouths of the bags, the latter are next caused to traverse the tape-squeezing mechanism E. This mechanism comprises in part a pair of grooved rollers 530 keyed to vertical shafts 531 mounted in bearings 532 forming a part of a bracket 533 secured to the angle 200. The shafts 531 are provided with sprockets 534 driven by means of a chain 535 from a sprocket 536 located on the vertical shaft 310 which serves to drive one of the belts 217.

The bracket 533 is provided with an extension 537 located between the bearings 532 and carrying a vertical shaft 538 upon which are mounted supporting arms 539 carrying sleeves 541 located opposite the bearings 532. Within the sleeves 541 are journalled vertical shafts 542 upon which are mounted grooved rollers 543 located opposite to the rollers 530.

The bearings 532 and the sleeves 541 are provided with lugs 544 and 545, respectively, through each set of which passes a rod 546 carrying a compression spring 547 located between the lug 545 and an adjustable nut 548 threaded on the rod 546.

The springs 547 act upon the lugs 545, forcing the rollers 543 firmly against the rollers 530 which oppose them. As the points of engagement of the rollers 530 and the rollers 543 are located directly in the line of travel of the mouths of the bags, the taped portions of the bag mouths lying above the belts 217 pass between the rollers 530 and 543 and are subjected to the considerable pressure exerted by the springs 547, which insures that the tape is firmly applied to the mouths of the bags.

The rollers 543 are driven by means of gears 549 mounted on the shafts 542 and adapted to mesh with gears 550 mounted on the shafts 531. The teeth of the gears 549 and 550 are cut sufficiently deep to maintain these gears in mesh with each other even when the shafts 542 are laterally displaced a short distance by the passage of the bag mouths between the rollers 530 and 543.

Upon the rear shaft 531 there is keyed a sprocket 552 which through the sprocket chain 467 drives the rollers 450 and 450'.

The arrangement of the drive is such that the peripheral speed of the rollers 530 and 543 corresponds exactly to the linear travel of the mouths of the bags lying in the grip of the belts 217.

As the taped mouths of the bags pass from between the rollers 450 and 450' to the tape-squeezing rollers 530 and 543, their upper edges are guided by means of a grooved roller 560 mounted on a shaft pin 561 at one end of a rod 562, the other end of which is set in a block 563 pivotally mounted on the rear rod 546 between a stop 564 and a companion block 565 which is rigidly fastened to the rod 546. The fixed block 565 carries an upwardly extending screw 566 which in turn carries a plate 567.

By means of a spring 568 lying between the plate 567 and the upper face of the block 563, the latter is biased downwardly against a stop plate 569 fastened to the bottom of the fixed block 565. The spring 568 is held in place by a core member 571 attached to the plate 567 and serving as a stop to limit upward movement of the block 563 and the roller 560. By means of the yielding downward force exerted by the roller 560, the upper folded edge of the tape is squeezed together and guided into the rollers 530 and 543.

The bags having been filled and sewed and pressure having been applied to the mouth of the bag to insure adherence of the tape thereto, the bags pass forward to the shearing mechanism F.

*Shear for severing tape and stitching*

It will be apparent that, due to the continuous operation of the rotary device A, the bags pass through the conveyor B in a uniformly spaced series, and after leaving the tape-squeezing station E, the bags are joined by a continuous web of tape and stitching. It is necessary to sever this web before the bags are delivered out of the machine, and this is performed automatically between such times as the bags pass through the shear F. The construction and operation of the latter are as follows:

A bridge member 600 fastened to the angles 200 and 201 has a centrally disposed lug 601 in which is journalled a horizontal shaft 602. Below the shaft 602, the bridge member 600 is provided with a slot 603, situated in the path of the tape carried by the bags moving forward in the grip of the belts 217.

The bridge member 600 is also provided with lugs 604 and 605, located on either side of the lug 601, in which are fastened two rods or studs 606 and 607, the forward ends of which are gripped by split collars 608 and 609 at the ends of a second bridge member 610. The bridge member 610 is provided with a bearing lug 611 adapted to receive the forward end of the shaft 602, and a slot 613 aligned with the slot 603 in the bridge member 600.

The rear face of the bridge member 600 adjacent to the sides of the slot 603 is provided with guides 614, while the forward face of the bridge member 600 and the rear face of the bridge member 610, adjacent the slots 603 and 613, respectively, are provided with fixed blades 615, the lower ends of which are slightly bent or sprung as shown in Fig. 40, and which blades 615 may be held in position laterally by means of stop pins 616.

Keyed to the shaft 602 is a boss 620 having an arm 621 carrying a pin 622 that is pivotally attached to an operating rod 623. The other end of the rod 623 is pivotally connected at 625 to one arm of a bell-crank 626 journalled on a stud shaft 627 fastened to the bridge member 600. The other arm of the bell-crank 626 is pivotally connected at 628 to a cam rod 630 terminating in a cam device or eccentric 631 on the shaft 294.

Rotation of the shaft 294 thus causes the arm 621 to move slowly back and forth in an arc of about 90°, the shaft 602 rotating likewise.

In the present instance, provision is made for making two cuts simultaneously, thus more or less completely cutting out the lengths of tape and stitching connecting the bags. The cutting is done by means of double-edged knife blades 635 mounted on the lower ends of two levers 636 and 637 journalled on the shaft 602, and adapted to move scissorwise across the blades 615 adjacent the slots 603 and 613, respectively, to sever the tape and stitching connecting adjacent bags.

The upper ends of the levers 636 and 637 are connected by means of a rod 640 which is connected by means of a tension spring 641 to the pin 622 in the end of the arm 621, and the levers 636 and 637 thus tend to follow the arm 621 as it moves back and forth. However, as the arm 621 moves away from one end of its stroke, the levers 636 and 637 remain behind, due to the action of a pin 642 mounted on the arm 636 and flexibly biased toward the rear of the machine by a leaf spring 643. The latter holds the pin 642 in one of the notches formed by the ends of an upstanding portion 644 of the member 600 and an inverted trapezoidal block 645 mounted thereon, and thus prevents the levers 636 and 637 from following the arm 621 until near the end of the stroke of the arm 621.

The pin 642 is released at or near the end of each stroke of the arm 621 by means of mechanism which we will now describe:

Mounted on the rear end of the shaft 602 is a collar 650 having a set screw 651 for fastening it rigidly to the shaft 602 and two arms 654 and 655 carrying set screws 656 and 657, respectively. As the arm 621 approaches the end of one stroke the set screw 656 on the arm 654 engages and lifts one arm of an L-shaped trigger 658 pivotally mounted on a stud 659 set in one of the inclined sides of the upstanding portion 644 of the bridge member 600. When this occurs, the other arm of the trigger 658 pushes the pin 642 against the action of the spring 643 out of the recess formed by the portion 644 and the block 645, thus permitting the levers 636 and 637 to follow the arm 621 to the opposite side, where the pin 642 drops into the opposite recess.

As the arm 621 then approaches the end of its next stroke, the set screw 657 in the rising arm 655 engages and lifts one of the arms of a second L-shaped trigger 660 mounted on a stud 661 set into the inclined side of the portion 644 opposite to that on which the trigger 658 is mounted, thus causing the trigger 660 to push the pin 642 out of the recess adjacent the block 645 and permitting the levers 636 and 637 to follow the arm 621 to the opposite side.

The arms 636 and 637 thus make a series of very rapid intermittent motions, first to one side and then the other, the motions being so timed as to follow the passage of each bag through the slot 613. At each stroke, the blades 635 cooperate with the fixed blades 615 to shear the tape and stitching lying in the path of the blades 635.

A stop plate 670 is provided to limit the movement of the upper arms of the triggers 658 and 660, and an L-shaped member 671 also fastened to the block 645 carries a leaf spring 672 which normally keeps the triggers 658 and 660 out of the way of the pin 642.

Stops 674 and 675 are mounted on the bridge member 600 for limiting the travel of the levers 636 and 637.

When the bags are closely spaced together on the conveyor B, a single cut may be made between the bags, in which event the knife lever 637 is removed. However, it is preferred to employ both the levers 636 and 637, two cuts being made simultaneously by the blades 635 mounted on these levers.

The position of the member 610 with respect to the stud shafts 606 and 607, and also the eccentric 631, are so adjusted that the forward blade 635 on the arm 637 makes a cut just behind the rear end of one bag while the rear blade 635 on the arm 636 makes a cut just ahead of the forward end of the following bag. The severed piece of tape and stitching simply falls out of the machine. This operation occurs after each bag passes through the slot 613 or 603 as the case may be, depending upon whether a double cut or a single cut is made.

The bags having been filled, the mouths of the bags having been sewn and taped, and the tape and stitching connecting the bags having been severed, the bags are delivered out of the forward end of the machine.

Our invention makes possible the filling of large open-mouth paper bags with granular or pulverulent material and the subsequent sewing and sealing of the filled bags at a high rate and with high efficiency. As many as 12 or 18 or even more 100-pound bags may be filled, sewed, taped and severed per minute without difficulty, the rate of operation being limited in practice only by the ability of the operator to insert bags into the rotary device A and the maximum speed of the auxiliary mechanisms such as the sewing machine.

It will be obvious to those skilled in the art that numerous changes and variations in the specific details of our invention may be made without departing from the essential teaching thereof. Our invention is not, therefore, limited to the details of the illustrative example or examples given hereinabove but may variously be embodied within the scope of the claims hereinafter made.

What we claim is:

1. In a machine for filling and closing open-mouth bags, in combination, a continuously moving device comprising a plurality of grippers to receive and grip the upper corners of a series of upright open-mouth bags, means located above the path of the bags on said device to deliver predetermined quantities of material to said bags, a continuously moving conveyor comprising means to grip the upper ends of said bags and to advance the mouths of said bags in definite alignment, and means located along said conveyor for closing said bags, said grippers presenting said bags to said conveyor at spaced intervals with their mouths in proper alignment with said closing means.

2. In a machine for filling and closing open-mouth bags, a continuously moving rotary device having a plurality of grippers to grip the upper corners of a series of upright, filled, open-mouth bags and to present the same to an ejecting position in definite alignment, a continuously moving conveyor comprising means to grip the upper ends of and to advance the mouths of said bags in definite alignment, said conveyor extending away from the ejecting position of said rotary device and gripping said bags at said position, and means for closing said bags as they are advanced by said conveyor.

3. In a machine for filling and closing open-mouth bags, a continuously moving rotary device comprising a plurality of grippers to receive and grip the upper corners of a series of upright, open-mouth bags, means located above the path of the bags on said rotary device to deliver predetermined quantities of material to said bags, a continuously moving conveyor comprising means to grip the upper ends of said bags and to advance the mouths of said bags in definite alignment, and means located along said conveyor for closing said bags, said grippers presenting said bags to said conveyor at spaced intervals with their mouths in proper alignment with said closing means.

4. In a machine for filling and closing open-mouth bags, a continuously moving rotary device having a plurality of grippers to grip the upper corners of a series of upright, filled, open-mouth bags, a continuously moving conveyor comprising means to grip the upper ends of said bags and to advance the mouths of said bags in definite alignment, means located along said conveyor for closing said bags, said grippers presenting said bags to said conveyor at spaced intervals with their mouths in proper alignment with said closing means, and means to open each of said grippers when the portion of a bag adjacent thereto is gripped by said conveyor.

5. In a machine for filling and closing open-mouth bags, a continuously moving rotary device having a plurality of pairs of grippers to receive and grip the upper corners of a series of upright, open-mouth bags, means for filling said bags as they are continuously advanced by said rotary device, a continuously moving, endless belt conveyor extending from said rotary device to advance said bags, said conveyor comprising contacting reaches gripping the mouths of said bags and maintaining the mouths in definite alignment, and means for closing the mouths of the bags as they are advanced by said conveyor, said grippers presenting said bags to said endless belt conveyor with their mouths in proper alignment to be closed by said closing means.

6. In a machine for filling and closing open-mouth bags, in combination, a rotary device having a plurality of pairs of grippers adapted to receive the upper corners of a series of bags, a continuous conveyor comprising a pair of parallel opposed belts adapted to receive and grip the bags therebetween at the mouths thereof, the rear intersection of said belts being located in vertical alignment with a point located on the circular path of said grippers.

7. In a machine for filling and closing open-mouth bags, in combination, a rotary device having a plurality of pairs of grippers adapted to receive the upper corners of a series of bags, a continuous conveyor comprising a pair of parallel belts adapted to receive and grip the bags therebetween at the mouths thereof, the point of entry into said conveyor being located in vertical alignment with a point on the circular path of said grippers, and the axis of rotation of said rotary device being located on one side and to the rear of said point of entry.

8. In a machine for filling open-mouth bags, a plurality of pairs of grippers adapted to grip the upper and outer corners of a series of bags and adapted to rotate about a vertical axis, means for raising and lowering said pairs of grippers as they rotate, a filling spout located between the grippers in each pair and positioned to enter the mouth of a bag held by the corresponding pair of grippers when said grippers are raised, and means adapted to deliver predetermined quantities of material through said spouts to said bags in series during such time as said spouts are inserted into the mouth of said bags.

9. In a machine for filling open-mouth bags, a plurality of pairs of grippers adapted to grip the upper and outer corners of a series of bags and adapted to rotate about a vertical axis, means adapted to simultaneously raise and partly draw together each pair of grippers in sequence during rotation thereof, filling means positioned to enter the mouths of the gripped bags when said grippers have been raised and drawn together, and means adapted to lower and spread said pairs of grippers at a subsequent point in the rotation thereof.

10. In a machine for filling open-mouth bags, a plurality of pairs of grippers adapted to grip the upper and outer corners of a series of bags and adapted to rotate about a vertical axis, means adapted to simultaneously raise and partly draw together each pair of grippers in sequence during rotation thereof, filling means positioned to enter the mouths of the gripped bags when said grippers have been raised and drawn together, means adapted to lower and spread said pairs of grippers at a subsequent point in the rotation thereof, and means associated with said filling means for delivering predetermined quantities of material to said gripped bags.

11. In a machine for filling and closing open-mouth bags, in combination, a traveling device having a plurality of depending filling spouts, a corresponding plurality of pairs of grippers having means to grip the upper corners of a series of open-mouth bags on opposite sides of said spouts, and means for varying the relative positions of said grippers vertically and laterally with respect to the positions of the corresponding spouts during travel of said device.

12. In a machine for filling and closing open-mouth bags, in combination, a rotary device having a plurality of depending filling spouts, a corresponding plurality of pairs of grippers adapted to grip the upper corners of a series of open-mouth bags on opposite sides of said spouts, means adapted to lower each pair of grippers in sequence to lower the mouth of the bag gripped thereby below the lower end of the corresponding spout, and a conveying device located in the subsequent path of said bags and adapted to receive said bags from said grippers.

13. In a machine for filling open-mouth bags, a rotary device, a pair of grippers carried by said device, and adapted to grip the upper corners of an open-mouth bag, means for raising said grippers in unison and simultaneously moving one of said grippers toward the other at a predetermined point in the path of rotation of said grippers, filling means carried by said device and positioned so as to be within the mouth of the bag when said grippers are raised, means for actuating said filling means to deliver a predetermined quantity of material to said bag, and means adapted to lower and spread said grippers thereafter to cause the mouth of the bag to be lowered below the end of the spout and to draw the mouth of the bag taut and closed.

14. In a machine for filling open-mouth bags, a rotary conveyor having a plurality of vertically reciprocable pairs of outwardly extending arms carrying gripping devices adapted to grip the upper corners of a series of open-mouth bags, means to raise and lower said pairs of arms during rotation thereof, a plurality of filling spouts so located as to enter the mouths of bags secured by the corresponding pairs of gripping devices when the latter are in raised positions and to be withdrawn from the mouths of the bags when said gripping devices are lowered, and means adapted to deliver predetermined quantities of material to said filling spouts in sequence as the latter are advanced past a predetermined point in that portion of the cycle of rotation in which said spouts are inside the mouths of the bags held by the corresponding gripping devices.

15. In a machine for filling open-mouth bags, a rotary conveyor having a plurality of vertically reciprocable pairs of outwardly extending arms carrying gripping devices adapted to grip the upper corners of a series of open-mouth bags, means adapted to raise and lower said pairs of arms during rotation thereof, a plurality of filling spouts so located as to enter the mouths of bags secured by the corresponding pairs of gripping devices when the latter are in raised positions and to be withdrawn from the mouth of the bags when said gripping devices are lowered, means adapted to deliver predetermined quantities of material to said filling spouts in sequence as the latter are advanced past a predetermined point in that portion of the cycle of rotation in which said spouts are inserted in the mouths of the bags held by the corresponding gripping devices, and means located at a subsequent point in said cycle of rotation adapted to jog the filled bags to settle the contents thereof.

16. In a machine for filling open-mouth bags, a rotary conveyor having a plurality of vertically reciprocable pairs of outwardly extending arms having gripping devices adapted to grip the upper corners of a series of open-mouth bags, means adapted to raise and lower said pairs of arms during rotation thereof, a plurality of filling spouts so located as to enter the mouths of bags secured by the corresponding pairs of gripping devices when the latter are in raised positions and to be withdrawn from the mouths of the bags when said gripping devices are lowered, means adapted to deliver predetermined quantities of material to said filling spouts in sequence as the latter are advanced past a predetermined point in that portion of the cycle of rotation in which said spouts are inserted in the mouths of the bags held by the corresponding gripping devices, a continuous conveyor comprising a pair of opposed endless belts adapted to receive the filled bags from said gripping devices in sequence, and means for releasing said gripping devices as the portions of the bags held thereby are received by said belts.

17. In a machine for filling and closing open-mouth bags, a rotary conveyor having a plurality of vertically reciprocable pairs of outwardly extending arms having gripping devices adapted to grip the upper corners of a series of open-mouth bags, a peripherally disposed cam adapted to raise and lower said pairs of arms during rotation thereof, a plurality of filling spouts so located as to enter the mouths of bags secured by the corresponding pairs of gripping devices when the latter are in raised positions and to be withdrawn from the mouths of the bags when said gripping devices are lowered, means adapted to deliver predetermined quantities of material to said filling spouts in sequence as the latter are advanced past a predetermined point in that portion of the cycle of rotation in which said spouts are inserted in the mouths of the bags held by the corresponding gripping devices, a continuous conveyor comprising a pair of opposed endless belts adapted to receive the filled bags from said gripping devices in sequence and to grip the bags with their mouths projecting above said belts, means for releasing said gripping devices as the portions of the bags held thereby are received by said belts, and means associated with said continuous conveyor adapted to seal the projecting mouths of the bags advanced thereby.

18. In a machine for filling and closing open-mouth bags, a rotary conveyor having a plurality of vertically reciprocable pairs of outwardly extending arms having gripping devices adapted to grip the upper corners of a series of open-mouth bags, a peripherally disposed cam adapted to raise and lower said pairs of arms during rotation thereof, a plurality of filling spouts so located as to enter the mouths of bags secured by the corresponding pairs of gripping devices when the latter are in raised positions and to be withdrawn from the mouths of the bags when said gripping devices are lowered, means adapted to deliver predetermined quantities of material to said filling spouts in sequence as the latter are advanced past a predetermined point in that portion of the cycle of rotation in which said spouts are inserted in the mouths of the bags held by the corresponding gripping devices, a continuous conveyor comprising a pair of opposed endless belts adapted to receive the filled bags from said gripping devices in sequence, means for releasing said gripping devices as the portions of the bags held thereby are received by said belts, and closing mechanism associated with said continuous conveyor and adapted to close the mouths of the bags advanced thereby.

19. In a machine for filling open-mouth bags, a rotary conveyor having a plurality of vertically reciprocable pairs of outwardly extending arms having gripping devices adapted to grip the upper corners of a series of open-mouth bags, a peripherally disposed cam adapted to raise and lower said pairs of arms during rotation thereof, a plurality of filling spouts so located as to enter the mouths of bags secured by the corresponding pairs of gripping devices when the latter are in raised positions and to be withdrawn from the mouths of the bags when said gripping devices are lowered, and a plurality of weighing devices adapted to deliver predetermined quantities of material to said spouts as the latter pass a predetermined point in the cycle of rotation.

20. In a machine for filling open-mouth bags, a rotary conveyor having a plurality of vertically reciprocable pairs of outwardly extending arms having gripping devices adapted to grip the upper corners of a series of open-mouth bags, a peripherally disposed cam adapted to raise and lower said pairs of arms during rotation thereof, a plurality of filling spouts so located as to enter the mouths of bags secured by the corresponding pairs of gripping devices when the latter are in raised positions and to be withdrawn from the mouths of the bags when said gripping devices are lowered, a plurality of weighing devices located above said spouts and means actuated in accordance with the rotation of said conveyor for operating said weighing devices in sequence to deliver predetermined quantities of material to said spouts as the latter pass through a predetermined portion of their cycle of rotation.

21. In a machine for filling open-mouth bags, a rotary conveyor having a plurality of vertically reciprocable pairs of outwardly extending arms having gripping devices adapted to grip the upper corners of a series of open-mouth bags, a peripherally disposed cam adapted to raise and lower said pairs of arms during rotation thereof, a plurality of filling spouts so located as to enter the mouths of bags secured by the corresponding pairs of gripping devices when the latter are in raised positions and to be withdrawn from the mouths of the bags when said gripping devices are lowered, and a plurality of weighing devices operated in sequence to deliver predetermined quantities of material to said bags as the corresponding spouts pass a predetermined point in the cycle of rotation.

22. In a machine for filling open-mouth bags, a rotary conveyor having a plurality of vertically reciprocable pairs of outwardly extending arms having gripping devices adapted to grip the upper corners of a series of open-mouth bags, a peripherally disposed cam adapted to raise and lower said pairs of arms during rotation thereof, a plurality of filling spouts so located as to enter the mouths of bags secured by the corresponding pairs of gripping devices when the latter are in raised positions and to be withdrawn from the mouths of the bags when said gripping devices are lowered, a pair of weighing devices located above said spouts, and means for operating said weighing devices alternately to discharge predetermined quantities of material into alternate bags as the latter pass a predetermined point in their cycle of rotation.

23. In a machine for filling open-mouth bags, a rotating support having a plurality of pairs of vertical guides, a corresponding plurality of pairs of rods mounted in said guides and carrying outwardly extending gripping devices adapted to receive and grip the upper corners of a series of open-mouth bags, a filling spout located between each pair of gripping devices, a cam roller connected to each pair of vertical rods and a cam device associated therewith and adapted to cause said pairs of rods to rise and fall as said support rotates, whereby each pair of grippers is caused to rise above and fall below the corresponding spout during rotation of said support.

24. In a machine for filling open-mouth bags, a filling spout, a pair of grippers located on opposite sides of said spout, and adapted to receive and grip the upper corners of a bag when the mouth of the bag is drawn over said spout, means for lowering said grippers to points below the bottom of the spout to withdraw the bag from the spout, and means for spreading said grippers apart as they are lowered below said spout to maintain tension upon the mouth of the bag when the bag is thus withdrawn from the spout.

25. In a machine for filling open-mouth bags, a filling spout, a pair of grippers located on opposite sides of said spout, said grippers having flexible means adapted to bias them apart, means for elevating said grippers to a bag-attaching position above the bottom of said spout, in which position said grippers are adapted to receive and grip the upper corners of a bag, means adapted to decrease the distance between said grippers during elevation thereof, and means for lowering said grippers to free the bag from said spout.

26. In a machine for filling open-mouth gussetted bags, in combination, a filling spout adapted to be inserted in the mouth of a bag, a pair of grippers adapted to receive and grip the upper and outer gussetted corners of the bag on opposite sides of said spout, flexible means for biasing said grippers apart, and means for decreasing the distance between said grippers while said spout is inserted in said bag.

27. In a machine for filling open-mouth bags, a pair of advancing grippers adapted to grip the upper corners of an open-mouth bag, the rear gripper being yieldably biased in a direction opposite to the direction of the advancing motion, and a conveyor comprising a pair of opposed endless belt devices adapted to receive the mouth of the bag from said grippers.

28. In a machine for filling open-mouth bags, a pair of advancing grippers adapted to grip the upper corners of an open-mouth bag, the rear gripper being yieldably biased in a direction opposite to the direction of the advancing motion, and a conveyor comprising a pair of opposed endless belt devices adapted to receive the mouth of the bag from said grippers, the linear speed of said conveyor being greater than that of said grippers, whereby the mouth of the bag is maintained under tension and in a closed position as it is fed into said conveyor.

29. In a machine for filling open-mouth bags, a rotating carriage, a gripper fixed to said carriage and adapted to receive and grip the forward upper corner of an open-mouth bag, a second gripper pivotally mounted on said carriage and adapted to receive and grip the rear upper corner of said open-mouth bag, flexible means adapted to exert a yielding force against said second gripper in a direction opposite to the direction of rotation of said carriage, a conveyor adapted to receive the bag from said grippers in turn, the linear speed of said conveyor being slightly greater than that of said carriage and means for releasing each of said grippers in turn as the portions of the bag held thereby are received by said conveyor.

30. In a machine for filling open-mouth bags, a rotating carriage, a gripper fixed to said carriage and adapted to receive and grip the forward upper corner of an open-mouth bag, a second gripper pivotally mounted on said carriage and adapted to receive and grip the rear upper corner of said open-mouth bag, flexible means adapted to exert a yielding force against said second gripper in a direction opposite to the direction of rotation of said carriage, a conveyor adapted to receive the bag from said grippers, and means for releasing each of said grippers in turn as the portions of the bag held thereby are received by said conveyor.

31. In a machine for filling open-mouth bags, a rotating carriage, a gripper fixed to said carriage and adapted to receive and grip the forward upper corner of an open-mouth bag, a second gripper pivotally mounted on said carriage and adapted to receive and grip the rear upper corner of said open-mouth bag, flexible means adapted to exert a yielding force against said second gripper in a direction opposite to the direction of rotation of said carriage whereby to draw the bag mouth into closed position, a conveyor adapted to receive the closed bag mouths from each of said grippers in turn, the linear speed of said conveyor being slightly greater than that of said carriage, filling means adapted to deliver a predetermined quantity of material to said bag as it is advanced by said grippers, and means for closing the filled bag as it is advanced by said conveyor.

32. In a machine for filling open-mouth bags, in combination, a filling spout adapted to enter the mouth of the bag, means for gripping the upper and outer corners of the bag on either side of said spout, means for delivering a predetermined quantity of material to said bag while so gripped, and means adapted to lower and spread said gripping means to effect the withdrawal of the spout from the mouth of the bag and to close the mouth of the bag.

33. In a machine for filling open-mouth bags, in combination, a filling spout adapted to enter the mouth of a gussetted bag, a pair of grippers located on opposite sides of said spout above the bottom of the spout and adapted to grip the upper gussetted corners of the bag when the mouth of the bag is drawn over the end of the spout, bias means for exerting a yielding force tending to spread said grippers, a detent for holding said grippers against the force exerted by said bias means, means for effecting relative withdrawal of the spout from the bag mouth, and means for releasing said grippers from said detent to permit said grippers to spread under the force exerted by said bias means to draw the mouth of the bag taut and closed.

34. In a machine for filling and closing open-mouth bags, in combination, a filling spout adapted to enter the mouth of a gussetted bag, a pair of grippers located on opposite sides of said spout above the bottom of the spout and adapted to grip the upper gussetted corners of the bag when the mouth of the bag is drawn over the end of the spout, bias means for exerting a yielding force tending to spread said grippers, a detent for holding said grippers against the force exerted by said bias means, means for effecting withdrawal of the spout from the bag mouth and means for releasing said grippers from said detent to permit said grippers to spread under the force exerted by said bias means to draw the mouth of the bag taut and closed, a conveyor located in the path of the bag and having means for gripping the mouth of the bag along the sides thereof, means for releasing said grippers to transfer the bag to said conveyor, and closing mechanism located along the path of the bag and adapted to close the projecting mouth of the bag as it is advanced by said conveyor.

35. In a machine for filling open-mouth bags, a rotating carriage, a filling spout mounted on said carriage, a pair of gripping devices also mounted on said carriage on opposite sides of said spout and adapted to receive and grip the upper corners of an open-mouth bag drawn over said spout and to hold the bag in movable relation to the spout, operating members for said gripping devices and a member adapted to engage said operating members whereby to close said gripping devices at a predetermined point in the cycle of rotation of said carriage.

36. In a machine for filling open-mouth bags, a rotating carriage, a filling spout mounted on said carriage, a pair of gripping devices also mounted on said carriage on opposite sides of said spout and adapted to receive and grip the upper corners of an open-mouth bag drawn over said spout and to hold the bag in movable relation to the spout, operating members for said gripping devices and a member adapted to engage said operating members whereby to open said gripping devices at a predetermined point in the cycle of rotation of said carriage.

37. In a machine for filling open-mouth bags, a rotating carriage, a filling spout mounted on said carriage, a pair of gripping devices also mounted on said carriage on opposite sides of said spout and adapted to receive and grip the upper corners of an open-mouth bag drawn over said spout and to hold the bag in movable relation to the spout, operating members for said gripping devices and a member adapted to engage said operating members whereby to close said gripping devices at a predetermined point in the cycle of rotation of said carriage, and a member adapted to engage said members whereby to open said gripping devices at a predetermined subsequent point in the cycle of rotation of said carriage.

38. In a machine for filling open-mouth bags, a rotating carriage, a filling spout mounted on said carriage, a pair of gripping devices also mounted on said carriage on opposite sides of said spout and adapted to receive and grip the upper corners of an open-mouth bag drawn over said spout and to hold the bag in movable relation to the spout, operating handles for said gripping devices and a member adapted to engage said operating handles whereby to close said gripping devices at a predetermined point in the cycle of rotation of said carriage, a second member adapted to engage said handles whereby to open said gripping devices at a predetermined subsequent point in the cycle of rotation of said carriage, and filling means adapted to deliver a predetermined quantity of material to said bag between the engagements of said handles with said first member and said second member, respectively.

39. In a machine for filling open-mouth bags, a rotating carriage, a filling spout mounted on said carriage, a pair of gripping devices also mounted on said carriage on opposite sides of said spout and adapted to receive the upper corners of an open-mouth bag drawn over said spout, operating handles for said gripping devices, a member adapted to engage said operating handles whereby to close said gripping devices at a predetermined point in the cycle of rotation of said carriage, and a clip adapted to receive and hold the upper edge of the bag until one of said gripping devices is closed by said member.

40. In a machine for filling open-mouth bags, a moving support, a filling spout mounted on said support, a gripping arm having a fixed position relative to the movement of said support located ahead of said spout and adapted to grip the upper forward corner of an open-mouth bag the mouth of which is drawn over the lower end of said spout, a second gripping arm pivotally mounted on said support to the rear of said spout and adapted to grip the rear upper corner of said bag, means for yieldably biasing said second gripping arm in a direction opposite to the direction of movement of said support, means for raising and lowering said gripping arms relative to said spout during rotation thereof, and means for moving said second gripping arm toward said first-mentioned gripping arm when said arms are raised above the bottom of said spout.

41. In a machine for filling open-mouth bags, a moving support, a filling spout mounted on said support, a gripping arm having a fixed position relative to the movement of said support, located on one side of said spout and adapted to grip the upper forward corner of an open-mouth bag the mouth of which is drawn over the lower end of said spout, a second gripping arm pivotally mounted on said support on the opposite side of said spout and adapted to grip the rear upper corner of said bag, means for yieldably biasing said second gripping arm in a direction opposite to the direction of movement of said support, means for raising and lowering said gripping arms relative to said spout during rotation thereof, means for moving said second gripping arm toward said first mentioned gripping arm when said arms are raised above the bottom of said spout, a pair of opposed endless belts adapted to receive and grip said bag along the sides of the bag mouth, and means for releasing the bag from said gripping arms as the bag is received by said belts.

42. In a machine for filling open-mouth bags, a moving support, a filling spout mounted on said support, a gripping arm having a fixed position relative to the movement of said support, located ahead of said spout and adapted to grip the upper forward corner of an open-mouth bag the mouth of which is drawn over the lower end of said spout, a second gripping arm pivotally mounted on said support to the rear of said spout and adapted to grip the rear upper corner of said bag, means for yieldably biasing said second gripping arm in a direction opposite to the direction of movement of said support, means for raising and lowering said gripping arms relative to said spout during rotation thereof, means for moving said second gripping arm toward said first-mentioned gripping arm when said arms are raised above the bottom of said spout, a pair of opposed endless belts moving at a linear speed greater than that of said support, located in the path of the mouth of the bag advanced by said gripping arms, and means for releasing the corners of the bag from said gripping arms in sequence as said corners are received by said belts.

43. In a machine for filling and closing open-mouth bags, in combination, a rotary device having means adapted to receive a bag to be filled, means associated with said device for filling said bag, and a conveyor comprising a pair of closely adjacent endless belts engaging the sides of the bag below the mouth thereof, adapted to receive the filled bag from said rotary device and to progress said bag, the axis of rotation of said rotary device being located on one side of a plane drawn through the point of entrance of said bag into said conveyor and perpendicular to the direction in which said bag is progressed by said conveyor.

44. In a machine for filling and closing open-mouth bags, in combination, a rotary device having means adapted to receive a bag to be filled, means associated with said device for filling said bag, and a conveyor comprising a pair of closely adjacent endless belts engaging the sides of the bag below the mouth thereof, adapted to receive the filled bag from said rotary device and to progress said bag, the axis of said rotary device being spaced a distance equal to approximately one-third of the width of the unfilled bag to the rear of a plane drawn through the point of entrance of said bag into said conveyor and perpendicular to the direction in which said bag is progressed by said conveyor.

45. In a machine for filling and closing open-mouth bags, in combination, a rotary device having means adapted to receive a bag to be filled, means associated with said device for filling said bag, and a conveyor comprising a pair of closely adjacent endless belts engaging the sides of the bag below the mouth thereof, adapted to receive the filled bag from said rotary device and to progress said bag, the locations of said rotary device and said conveyor with respect to each other being such that the angularity of that portion of the bag mouth lying outside of the conveyor reverses with respect to the direction of movement of the bag in said conveyor as the bag is being introduced into said conveyor.

46. In a machine for filling and closing open-mouth bags, in combination, a rotary device having means adapted to receive a bag to be filled, means associated with said device for filling said bag, and a conveyor comprising a pair of closely adjacent endless belts engaging the sides of the bag below the mouth thereof, adapted to receive the filled bag from said rotary device and to progress said bag, the locations of said rotary device and said conveyor with respect to each other being such that the angularity of that portion of the bag mouth lying outside of the conveyor is approximately bisected by a line forming an extension of the line of movement of the bag mouth in the conveyor during such time as the first two-third portion of the bag mouth is entering said conveyor.

47. In a machine for filling and closing open-mouth bags, in combination, a rotary device having means adapted to receive a bag to be filled, means associated with said device for filling said bag, and a conveyor adapted to receive the filled bag from said rotary device and to progress said bag, said conveyor comprising a pair of opposed endless belts rotating over pairs of adjacent pairs of pulley devices, and the axis of rotation of said rotary device being located to the rear of a plane drawn through the axis of rotation of the rear pair of pulleys and perpendicular to the direction in which the bag is progressed by said conveyor.

48. In a machine for filling and closing open-mouth bags, in combination, a rotary device having means adapted to receive a bag to be filled, means associated with said device for filling said bag, and a conveyor adapted to receive the filled bag from said rotary device and to progress said bag, said conveyor comprising a pair of opposed endless belts rotating over pairs of adjacent pairs of pulley devices, and the axis of rotation of said rotary device being located to the rear of a plane drawn through the axis of rotation of the rear pair of pulleys and perpendicular to the direction in which the bag is progressed by said conveyor, by a distance less than the width of the unfilled bag.

49. In a machine for filling open-mouth bags; a rotating carriage, a gripper mounted on said carriage and adapted to receive and grip the forward upper corner of a bag, a second gripper mounted on said carriage and adapted to receive and grip the rear upper corner of said bag, and toggle means connecting said grippers and adapted to vary the distance between said grippers.

50. In a machine for filling open-mouth bags; a conveyor having a filling spout thereon, a pair of grippers pivotally mounted on said conveyor and having means to receive and grip the upper corners of a bag positioned about said spout, means for raising said grippers above the mouth of said spout and for lowering said grippers below the mouth of said spout, toggle means connecting said grippers, and means cooperating with said toggle to cause said grippers to pivot toward each other to spread the mouth of the bag when said grippers are above the mouth of said spout, and means to cause said toggle to yieldably spread said grippers to draw the mouth of the bag closed when said grippers are below the mouth of said spout.

ROBERT N. CUNDALL.
LINCOLN A. CUNDALL.